US011102702B2

(12) United States Patent
Ernst

(10) Patent No.: US 11,102,702 B2
(45) Date of Patent: Aug. 24, 2021

(54) METHOD FOR ESTABLISHING NETWORK CLUSTERS BETWEEN NETWORKED DEVICES

(71) Applicant: LEFT OF THE DOT MEDIA INC., Maple Ridge (CA)

(72) Inventor: Jason Bruce Ernst, Coquitlam (CA)

(73) Assignee: Intermesh Holdings Inc., Dubai (AE)

( * ) Notice: Subject to any disclaimer, the term of this patent is extended or adjusted under 35 U.S.C. 154(b) by 348 days.

(21) Appl. No.: 16/304,256

(22) PCT Filed: May 4, 2017

(86) PCT No.: PCT/CA2017/000116
§ 371 (c)(1),
(2) Date: Nov. 23, 2018

(87) PCT Pub. No.: WO2017/205959
PCT Pub. Date: Dec. 7, 2017

(65) Prior Publication Data

US 2020/0322871 A1 Oct. 8, 2020

Related U.S. Application Data

(60) Provisional application No. 62/343,056, filed on May 30, 2016.

(51) Int. Cl.
*H04W 40/32* (2009.01)
*H04W 76/11* (2018.01)
(Continued)

(52) U.S. Cl.
CPC ........... *H04W 40/32* (2013.01); *H04W 8/005* (2013.01); *H04W 40/246* (2013.01); *H04W 48/16* (2013.01); *H04W 76/11* (2018.02)

(58) Field of Classification Search
CPC ..... H04W 40/32; H04W 76/11; H04W 8/005; H04W 40/246; H04W 48/16;
(Continued)

(56) References Cited

U.S. PATENT DOCUMENTS 8,532,074 B2 * 9/2013 Navda .............. H04W 52/0203 370/338
2012/0246740 A1 9/2012 Brooker
(Continued)

FOREIGN PATENT DOCUMENTS

EP 3139697 A1 3/2017

OTHER PUBLICATIONS

Tessier, Serge, European Patent Office, Extended European Search Report, in connection with related European Patent Application No. 17805430, dated Oct. 9, 2019, 9 pages.
(Continued)

*Primary Examiner* — Mewale A Ambaye

(57) ABSTRACT

A method for establishing a network cluster between a plurality of devices having a wireless radio configurable in access point mode and a client mode involves causing a first device to be configured in client mode and in response to a determination by the first device that networking services associated with a network cluster name are not currently offered by another device, causing the first device to be configured in access point mode. In response to receiving a connection request at the first device from a second device configured in client mode, the method involves accepting the connection, determining a user identifier of the second device, and adding an entry to a connection listing on the first device. The method involves, in response to receiving data packets at the first device having a destination corresponding to the second device user identifier, transmitting the data packets to the second device.

18 Claims, 16 Drawing Sheets

(51) Int. Cl.
*H04W 8/00* (2009.01)
*H04W 40/24* (2009.01)
*H04W 48/16* (2009.01)

(58) Field of Classification Search
CPC ..... H04W 40/06; H04W 40/00; H04W 76/00; H04W 76/14; H04W 76/15; H04W 8/26; H04W 8/00; H04W 40/24; H04W 48/00; H04W 48/17; H04W 41/5058; H04W 29/08648
See application file for complete search history.

(56) References Cited

U.S. PATENT DOCUMENTS

| | | | | |
|---|---|---|---|---|
| 2014/0003286 | A1* | 1/2014 | Estevez | H04W 84/18 370/254 |
| 2014/0196025 | A1 | 7/2014 | Corinella | |
| 2015/0237666 | A1 | 8/2015 | Cho | |
| 2015/0312820 | A1* | 10/2015 | Yang | H04W 84/12 370/331 |
| 2015/0327024 | A1* | 11/2015 | Yang | H04W 48/20 370/312 |
| 2017/0070563 | A1* | 3/2017 | Sundermeyer | H04L 67/125 |
| 2017/0071015 | A1 | 3/2017 | Gervais et al. | |
| 2018/0206202 | A1* | 7/2018 | Merlin | H04B 7/0413 |
| 2018/0368170 | A1* | 12/2018 | Pelletier | H04W 4/029 |
| 2020/0260373 | A1* | 8/2020 | Panje | H04W 28/08 |

OTHER PUBLICATIONS

Sacha Trifunovic et al; “WLAN-Opp:Ad-hoc-less opportunistic networking on smartphones”, Ad Hoc Networks, vol. 25, Aug. 1, 2014, pp. 346-358, XP055623262, Amsterdam, NL.

Ivan Ong: “WiFi Optimizations to Improve SSID Priority to Enhance Overall Quality of Experience”, NCTA 2016, Spring Tech Forum, May 18, 2016 XP055366358, www.nctatechnicalpapers.com/Paper 2016.

International Search Report issued by the Canadian Intellectual Property Office in connection with International Patent Application No. PCT/CA2017/000116, dated Aug. 18, 2017, 3 pages.

Written Opinion of the International Searching Authority issued by the Canadian Intellectual Property Office in connection with International Patent Application No. PCT/CA2017/000116, dated Aug. 18, 2017, 4 pages.

Figiel, Barbara, European Patent Office, Extended European Search Report, in connection with European Patent Application No. 18848701.1, dated Apr. 7, 2021, 10 pages.

* cited by examiner

500

| | Connection listing for first device: Access point mode | | | | | | |
|---|---|---|---|---|---|---|---|
| 502 | uuid | ipaddr | nexthop | isMaster | isRouter | lastheard | hwAddress |
| 504 | 194 | 127.0.0.1 | 127.0.0.1 | TRUE | FALSE | -- | 6c:71:d9:54:49:e0 |
| 506 | 194 | 192.168.0.1 | 192.168.0.1 | TRUE | FALSE | -- | 6c:71:d9:54:49:e0 |
| 508 | 605 | 192.168.0.10 | 192.168.0.1 | FALSE | FALSE | 9:59:02 | 60:a4:4c:02:c9:0c |
| 510 | 278 | 192.168.0.20 | 192.168.0.1 | FALSE | FALSE | 10:05:33 | 6b:a1:3c:4b:c5:1c |
| 512 | 325 | 192.168.0.5 | 192.168.0.10 | FALSE | FALSE | 10.09.22 | 61:c1:1b:10:7d:e1 |

520

| | Connection listing for second device: Client mode | | | | | | |
|---|---|---|---|---|---|---|---|
| 522 | uuid | ipaddr | nexthop | isMaster | isRouter | lastheard | hwAddress |
| 524 | 605 | 127.0.0.1 | 127.0.0.1 | FALSE | FALSE | -- | 6c:71:d9:54:49:e0 |
| 526 | 605 | 192.168.0.10 | 192.168.0.1 | FALSE | FALSE | -- | 6c:71:d9:54:49:e0 |
| 528 | 194 | 192.168.0.1 | 192.168.0.1 | TRUE | FALSE | 10:00:01 | 60:a4:4c:02:c9:0c |
| 530 | 348 | 192.168.10.1 | 192.168.10.1 | TRUE | FALSE | 10:04:45 | 52:54:00:1f:a9:c2 |
| 532 | 278 | 192.168.0.20 | 192.168.0.1 | FALSE | FALSE | 10:05:00 | 6b:a1:3c:4b:c5:1c |
| 534 | 325 | 192.168.0.5 | 192.168.0.1 | FALSE | FALSE | 10.09.14 | 61:c1:1b:10:7d:e1 |

540

| | Connected access point listing for second device | |
|---|---|---|
| 542 | uuid | hwAddress (BSSID) |
| 544 | 194 | 6c:71:d9:54:49:e0 |
| 546 | 348 | 52:54:00:1f:a9:c2 |

```
syntax = "proto2";
package io.left;
option java_outer_classname = "MeshDnsProtos";
704— required RequestType type = 1;
706— required uint64 uuid = 2;
     enum RequestType {
             HELLO = 1;
             GOODBYE = 2;
             DISCOVER = 3;
             DISCOVER_RESP = 4;
             FIND = 5;                                   } 722
             FIND_RESP = 6;
             DATA = 7;
             NOTIFY = 8;
             ACK = 9;
     }
708—         repeated uint64 addr = 3;               ///HELLO request
710—         repeated uint64 peerID = 4;             ///DISCOVER AND FIND requests
712—         repeated DiscoverType discovery_type = 5;
714—         optional uint32 limit = 8;
             enum DiscoverType {
                     USER = 0;
                     TEXT = 1;
702                  IMAGE = 2;
                     AUDIO = 3;
                     VIDEO = 4;                          } 726
                     STREAM_AUDIO = 5;
                     STREAM_VIDEO = 6;
                     FILE = 7;
             }
716—         repeated Peer peer = 6;                 ///FIND_RESP, DISCOVER_RESP and NOTIFY
             message Peer {
                     required uint64 uuid = 1;
                     repeated uint64 addr = 2;           } 724
             }
718—         repeated Data data = 7;                 ///DATA
             message Data {
                     required uint32 length = 1;
                     optional uint64 seq_number = 2;
                     optional uint64 offset = 3;         } 726
                     required bytes contents = 4;
                     optional DiscoverType data_type = 5;
             }
720— repeated RequestType ack = 9;                   ///ACK
}
```

FIG. 7

METHOD FOR ESTABLISHING NETWORK CLUSTERS BETWEEN NETWORKED DEVICES

BACKGROUND

1. Field

This disclosure relates generally to networking of computer devices and more particularly to establishing a cluster network between a plurality of devices.

2. Description of Related Art

Wireless mesh networks may be established to provide a peer-based communication infrastructure between a plurality of computer devices. One benefit of implementing a mesh network is that more widespread network coverage may be provided than available using a single wireless access point. However, mesh networks have not seen widespread adoption in mobile devices such as smartphones due to limitations imposed by vendors on switching between operating in access point mode and client mode.

There remains a need for methods of establishing peer-based networks between a plurality of wireless devices.

SUMMARY

In accordance with one disclosed aspect there is provided a method for establishing a network cluster between a plurality of devices, each device having a wireless radio configurable in at least an access point mode and a client mode, the network cluster having an associated network name. The method involves causing a first device of the plurality of devices to be configured in the client mode. The method further involves, in response to a determination by the first device that networking services associated with the network name are not currently being offered by another of the plurality of devices, causing the first device to be configured in the access point mode, and offering networking services for the network name associated with the network cluster. The method also involves, in response to receiving a connection request at the first device from a second device configured in the client mode, accepting the connection, determining a user identifier associated with the second device, and adding an entry for the second device to a connection listing saved in memory on the first device. The method further involves, in response to receiving one or more data packets at the first device having a destination corresponding to the user identifier of the second device, transmitting the one or more data packets to the second device.

If no connection request is received at the first device while configured in the access point mode, the method may involve causing the first device to periodically alternate between being configured in the client mode and being configured in the access point mode until one of a connection request is received while the first device is in access point mode, or another device offering networking services associated with the network name is discovered while in client mode.

Causing the first device to alternate between being configured in the client mode and being configured in the access point mode may involve causing the first device to alternate between being in the client mode for a first period of time and being in the access point mode for a second period of time, at least one of the first and second periods of time including a random time component.

The method may involve in response to receiving connection requests at the first device from at least one additional device configured in the client mode, determining a user identifier associated with the additional device and adding the user identifier to the connection listing on the first device.

The method may involve receiving a find request at the first device from an originating device configured in client mode and connected to the first device, the find request including a user identifier associated with an intended recipient device, causing the first device to determine whether the connection listing on the first device includes the user identifier associated with the recipient device, the connection listing including entries for devices that have previously been encountered by the first device on the network cluster, and causing the first device to transmit a find request response to the originating device if the connection listing includes the user identifier associated with the recipient device, the find request response including a network address of the first device as a nexthop address for transmission of data between the originating device and the recipient device.

The connection listing on the first device may include at least one entry identifying a first neighboring device being connected to the first device via one or more devices configured in client mode and in connection range of both the first device and the first neighboring device, and the method may further involve, if the connection listing does not include the user identifier associated with the recipient device, causing the first device to transmit a discover request to the first neighboring device, the discover request including the user identifier of the recipient device and being operable to cause the first neighboring device to determine whether the recipient device is connected to a second neighboring device configured in access point mode and connected to the first neighboring device via one or more devices configured in client mode and in connection range of both the first and second neighboring devices, in response to receiving a discover request response from the first neighboring device at the first device updating the connection listing on the first device to include an entry for the recipient device, and causing the first device to transmit a find request response to the originating device, the find request response including a network address of the first device as a nexthop address for transmission of data between the originating device and the recipient device via the first neighboring device and the second neighboring device.

The discover request may include a time-to-live (TTL) data field defining a time period for which the discover request will be in effect to facilitate discarding of the discover request when the TTL expires.

The discover request response may include a timestamp added to the discover request response by each neighboring device through which the request response traverses, the timestamp being operable to prevent repetition of the discover request within a pre-determined timeframe.

Causing the first neighboring device to determine whether the recipient device is connected to the second neighboring device may involve forwarding the discover request to the second neighboring device, the discover request being operable to cause the second neighboring device to determine whether a connection listing on the second neighboring device includes the user identifier associated with the recipient device, and if the connection listing includes the user identifier associated with the recipient device, transmitting a discovery request response including a network address of the second neighboring device as a nexthop address back to the first device via the first neighboring device.

In response to receiving the discovery request response at the first neighboring device, the method may involve updating the connecting listing on the first neighboring device to include an entry for the recipient device including the network address of the second neighboring device as a nexthop address for transmission back to the second device and adding the network address of the first neighboring device to the discovery request response as a nexthop address for transmission back to the first device.

The method may involve causing the second device to periodically determine whether any neighboring devices are configured in the access point mode and offering networking services for the network name associated with the network cluster, and in response to the second device detecting a first neighboring device offering networking services for the network name associated with the network cluster, causing the second device to link the first neighboring device to the network cluster to form a merged network cluster by requesting an updated connection listing from the first device, disconnecting from the first device and connecting to the first neighboring device, requesting a connection listing from the first neighboring device, the connection listing stored in memory on the first neighboring device and including user identifiers of devices that are connected to the first neighboring device, providing the connection listing for the first device to the first neighboring device to facilitate updating of the connection listing on the first neighboring device, reconnecting to the first device and providing the connection listing for the first neighboring device to the first device to facilitate updating of the connection listing on the first device, and causing the first device to transmit received data packets, may involve in response to a determination by the first device that the received data packet has a destination corresponding to a device identifier associated with a client device in the connection listing on the first device that is connected to the first neighboring device, causing the data packet to be routed via the second device to the first neighboring device.

Causing the second device to periodically determine whether other devices are offering networking services for the network name associated with the network cluster may involve determining a basic service set identification (BSSID) associated with the first device, causing the second device to perform a scan of available networks, and for each detected device offering networking services associated with the network name, determining a BSSID associated with the device, a BSSID that differs from the BSSID of the first device being indicative that the device is configured in the access point mode and offering networking services for the network name.

Causing the data packet to be routed via the second device to the first neighboring device may involve in response to a determination by the first device that the second device is not currently connected to the first device, writing the data packet to a queue of data packets to be transmitted to the second device when connected to the first device.

The second device may include a connected access point listing stored in memory on the second device, the connected access point listing including at least one entry identifying the first device as a connected access point and in response to the second device detecting the first neighboring device causing the second device to add the first neighboring device to the connected access point listing, and causing the second device to periodically connect to each access point in the connected access point listing to route data packets between the access points and destination clients in the merged network cluster.

Routing data packets may involve maintaining a queue in memory on the second device for storing data packets received from a currently connected one of the first device and the first neighboring device and destined for the other of the first device and the first neighboring device, periodically disconnecting from the currently connected one of first device and the first neighboring device and connecting to the other first device and the first neighboring device, and transmitting the data in the queue to the other of the first device and the first neighboring device when connected.

The entry for the second device stored in the connection listing on the first device includes at least a user identifier and one or more of a network address of the second device within the cluster network, and a hardware identifier associated with the second device.

In a network cluster established between a plurality of devices, each device having a wireless radio configurable in at least an access point mode and a client mode, the plurality of devices including at least a first device configured in access point mode and a second device configured in client mode and connected to the first device, there is disclosed a method for communicating between the second device and an intended recipient device. The method involves causing the second device to determine whether a user identifier associated with the recipient device appears in a connection listing stored in memory on the second device, the connection listing including entries for devices that have previously been encountered on the network cluster. If the recipient device appears in the connection listing, the method further involves transmitting one or more data packets to the first device, the data packets including a user identifier associated with the recipient device. If the recipient device does not appear in the connection listing, the method involves transmitting a find request to the first device to initiate a lookup of the recipient device.

The method may involve receiving a find request response at the second device from the first device, the find request response acknowledging that the recipient device may be reachable over the network cluster and including an address of the first device as a nexthop address for transmission of data between the second device and the recipient device.

In accordance with another disclosed aspect there is provided a method for merging a first network cluster and a second network cluster each including a plurality of devices, each device having a wireless radio configurable in at least an access point mode and a client mode, the first network cluster including a first device and the second network cluster including a first neighboring device, the first device and first neighboring device being configured in access point mode and offering networking services associated with a common network name. The method involves causing a second device configured in client mode and in connection range of both the first device and the first neighboring device to periodically determine whether any neighboring devices are configured in the access point mode. The method further involves offering networking services for the network name associated with the network cluster, and in response to the second device detecting that the first neighboring device is offering networking services for the network name associated with the network cluster, causing the second device to link the first neighboring device to the network cluster to form a merged network cluster by requesting an updated connection listing from the first device, disconnecting from the first device and connecting to the first neighboring device, and requesting a connection listing from the first neighboring device. The connection listing is stored in memory on the first neighboring device and including user identifiers of devices that are connected to the first neighboring device. The method further involves providing the connection listing for the first device to the first neighboring device to facilitate updating of the connection listing on the first neighboring device, and reconnecting to the first device and providing the connection listing for the first neighboring device to the first device to facilitate updating of the connection listing on the first device.

The second device may include a connected access point listing stored in memory on the second device, the connected access point listing including at least one entry identifying the first device as a connected access point and in response to the second device detecting the first neighboring device causing the second device to add the first neighboring device to the connected access point listing, and causing the second device to periodically connect to each access point in the connected access point listing to route data packets between the access points and destination clients in the merged network cluster.

The network name may include a common identifier portion that identifies a network type and a random number identifying the specific instance of the network.

In response to a determination by the first device that networking services associated with the network name are not currently being offered by another of the plurality of devices, the method may further involve causing the first device to be configured for one of Bluetooth and WiFi Direct communications and offering networking services for the network name associated with the network cluster.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments,

FIG. 5 are examples of connection listings and a connected access point listing stored in a memory of the processor circuit of FIG. 2;

FIG. 7 is an example of a generic request/response message protocol used in establishing the network clusters shown in FIG. 3;

DETAILED DESCRIPTION

Figure 1:
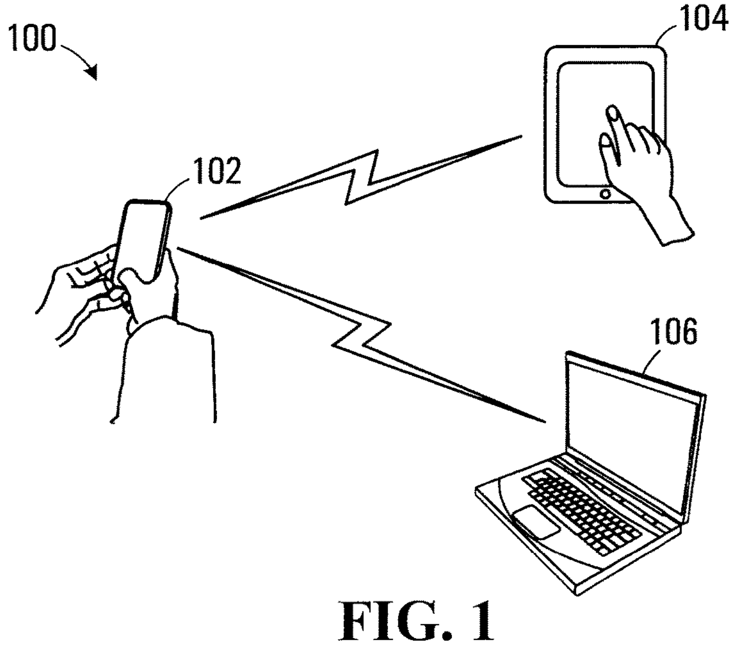
FIG. 1 is a schematic depiction of a network cluster established between a plurality of devices.

Referring to FIG. 1, a network cluster established between a plurality of devices is shown generally at 100. In the embodiment shown in FIG. 1, the network cluster 100 is established between a first device 102, a second device 104, and a device 106, each having a wireless radio (not shown). In this embodiment the first device 102 is a smartphone being operated by a user 108, the second device 104 is a tablet computer being operated by a user 110, and the device 106 is a laptop computer. In other embodiments the devices 102-106 may be any of a plurality of networked devices such as smartphones, tablets or laptop computers, desktop computers, stand-alone networking devices such as a router or access point, computer peripherals such as a printer, and/or physical objects such as a networked appliance, for example. In general for full participation in the network cluster 100 the devices should each have a wireless radio configurable in at least an access point mode and a client mode. However some devices are only able to operate as an access point only or in a client mode only and may still be part of the network cluster 100 but may not be able to perform some network establishment functions. The established network cluster 100 has an associated network name, which in one embodiment may be a service set identifier (SSID). In one embodiment the network name has the form "WAVE-*" where the "*" represents a random number. The "WAVE-" portion may be common to all networks established up as described herein to permit new users to connect to any network starting with "WAVE-". As such the network name includes a common identifier portion that identifies the network type as a "WAVE" network and a random number identifying the specific instance of the network. In the following description the SSID associated with the cluster network is assumed to be "WAVE-*" where the "*" should be understood to represent a random number.

In general each of the devices 102-106 has an application loaded in the form of computer readable instructions that cause the respective devices to provide functionality for establishing the network. For example, in the case of the first device 102 a smartphone application may be loaded and run to implement the required functionality. In this embodiment a unique user identifier is assigned to each of the plurality of devices 102, 104 and 106 in accordance with an assignment protocol defined in the application In this embodiment the network cluster 100 is established by the first device 102 initially being configured in the client mode and the device's wireless radio scanning or other devices configured in access point mode and offering networking services associated with the cluster network name "WAVE-*". If no other devices are currently offering networking services under the SSID "WAVE-*", then the first device 102 is not in range of a network cluster and the application causes device to be configured in the access point mode for offering network services for the network cluster under the SSID "WAVE-*". If another device in access point mode offering services for the network cluster under SSID "WAVE-*" is found then a network cluster has already been established and the first device may join the established cluster.

When configured in access point mode, the first device 102 listens for connection requests from other devices such as the second device 104. In IEEE 802.11 wireless networks the connection request is referred to as a "probe request". In response to receiving a connection request from a second device configured in the client mode (such as the second device 104), the first device 102 accepts the connection request and determines a user identifier associated with the second device 104 and adds an entry for the device to a connection listing stored in memory on the first device 102. In one embodiment the entry for the second device 104 in the connection listing includes the user identifier of the device and the network address of the device within the cluster network. Acceptance of the connection request for under IEEE 802.11 protocol may involve a process of requesting authentication and association by the second device before the connection is completed. While the embodiments disclose herein are described with reference to IEEE 802.11 networking protocols, the wireless network may be implemented using other wireless networking protocols such as Bluetooth®, Multipeer Connectivity framework on Apple iOS operating systems, Wi-Fi Direct or Wi-Fi P2P on Android operating systems.

Similarly, the first device 102 may also receive a connection or probe request from the device 106, and may add an entry for the device to the connection listing on the first device 102. The connection listing is used by the first device 102 to keep track of devices connected to the access point provided by the first device, such as the devices 104 and 106. Subsequently, if the first device 102 receives a data packet from the device 106 including the user identifier of the second device 104, the first device 102 determines whether the user identifier appears in the connection listing, and if so looks up the network address of the second device and transmits the data packet to the network address of the second device.

While the above process is described as being initiated by the first device 102 in the above description, in practice each device 102-106 may perform the same network cluster establishment process by periodically alternating between being configured in the client mode and being configured in the access point mode until either a connection request is received while in access point mode or another device is discovered that is offering networking services associated with the network name while in the access point mode.

The above disclosed cluster network establishment process overcomes a limitation associated with many smartphone and tablet devices, in that the wireless radio of the device may be limited by the manufacturer from simultaneously operating in client mode and hotspot mode, even though in some cases the wireless radio would be capable of such operation. The network cluster 100 is established by causing some devices such as the first device 102 to be configured in access point mode while other devices such as the devices 104 and 106 are configured in client mode. In establishing the network cluster 100, devices may also change configuration between client and access point mode depending on what services are being provided by other devices in the network cluster 100.

Additional devices may connect to the access point provided by first device 102 causing the network cluster 100 to expand to include a larger number of devices than depicted in FIG. 1. In practice a smartphone device may limit the number of simultaneous connections. For example some smartphone operating systems limit the connections to 3 devices while others may allow up to 10 or more simultaneous connections.

Figure 2:
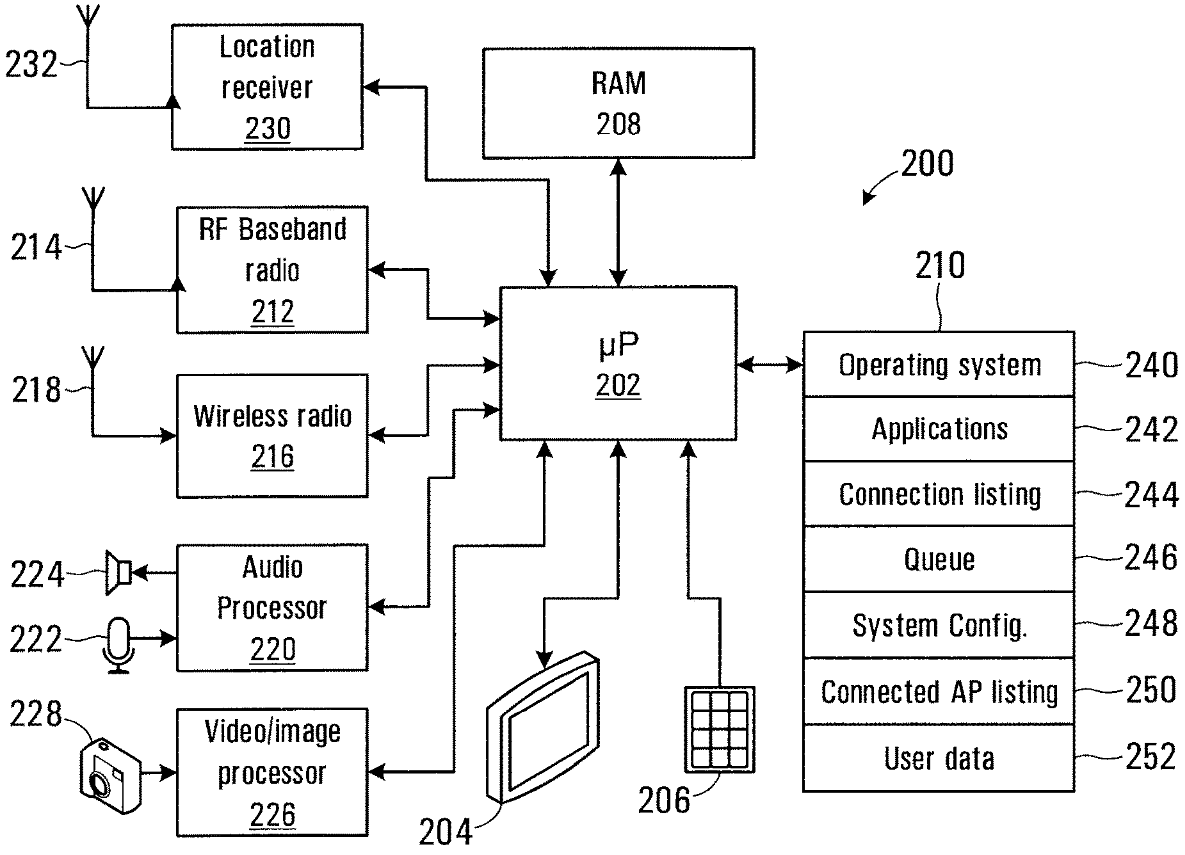
FIG. 2 is a block diagram of a processor circuit for implementing any of the devices shown in FIG. 1.

A block diagram of a processor circuit for implementing any of the devices is shown in FIG. 2. Referring to FIG. 2, the processor circuit 200 includes a microprocessor 202, which may include multiple processing cores. The processor circuit 200 also includes a display 204 and an input device 206 for receiving user input. In some embodiments the input device 206 may be provided as touch screen on the display 204. The processor circuit 200 also includes a random access memory 208 for storing data associated with applications that are running on the device. The processor circuit 200 also includes a non-volatile flash memory 210 for storing data. In the embodiment shown the non-volatile flash memory 210 includes an operating system storage location 240, an application storage location 242, a connection listing location 244, a queue location 246, a system configuration location 248. The non-volatile flash memory 210 may include a user data storage location 252 for storing audio, video, image, text and other data files and/or documents.

The processor circuit 200 further includes a RF baseband radio 212 and antenna 214 for connecting to a mobile telecommunications network. The RF baseband radio 212 may be configured to provide data communications using any of a variety of communications standards including 2G, 3G, 4G, or other communications standards.

The processor circuit 200 also includes a wireless radio 216 and antenna 218 for connecting to local networks such as an IEEE 802.11 WLAN local network. The wireless radio 216 may also provide for connections via other wireless protocols, such as Bluetooth, WiFi Direct, or near-field communication.

The processor circuit 200 further includes a location receiver 230. The location receiver 230 includes an antenna 232 for receiving global positioning system (GPS) signals and the location receiver 230 may use the GPS information in combination with other location information such as a known location of a particular local network access point or cellular signal triangulation information provided by a cellular service provider to determine a location of the networked device.

The processor circuit 200 further includes an audio processor 220, a microphone 222, and a speaker 224. The audio processor 220 receives and processes audio input signals from a microphone 222 and produces audio outputs at a speaker 224. The processor circuit 200 also includes a video/image processor 226 and a camera 228. The video/image processor 226 receives and processes image and/or video signals from the camera 228.

The display 204, input device 206, random access memory 208, non-volatile flash memory 210, RF baseband radio 212, wireless radio 216, audio processor 220, and video/image processor 226 are all in communication with the microprocessor 202.

The operating system storage location 240 stores codes for directing the microprocessor 202 to implement an operating system, which for a smartphone device may be an Android™ based operating system, an iOS based operating system or any other operating system that supports wireless communications. The remaining disclosure generally relates to implementations of the various disclosed embodiments under the Android based operating system, but the same principles also apply to other operating systems with a few implementation differences The first device 102 and the second device 104 may each be implemented using the processor circuit 200 similar to that shown in FIG. 2. The laptop computer device 106 may include many of the components shown in FIG. 2, with some components omitted such as the location receiver 230 and RF baseband radio 212. While embodiments are described herein with reference to the processor circuit 200 architecture in FIG. 2, the described system embodiments and/or process embodiment are also applicable to communications between other types of devices. In general each of the devices 102-106 has computer readable codes loaded into the application location 242 of the flash memory 210 that cause the respective devices to provide necessary functionality for establishing the network cluster 100.

Figure 3:
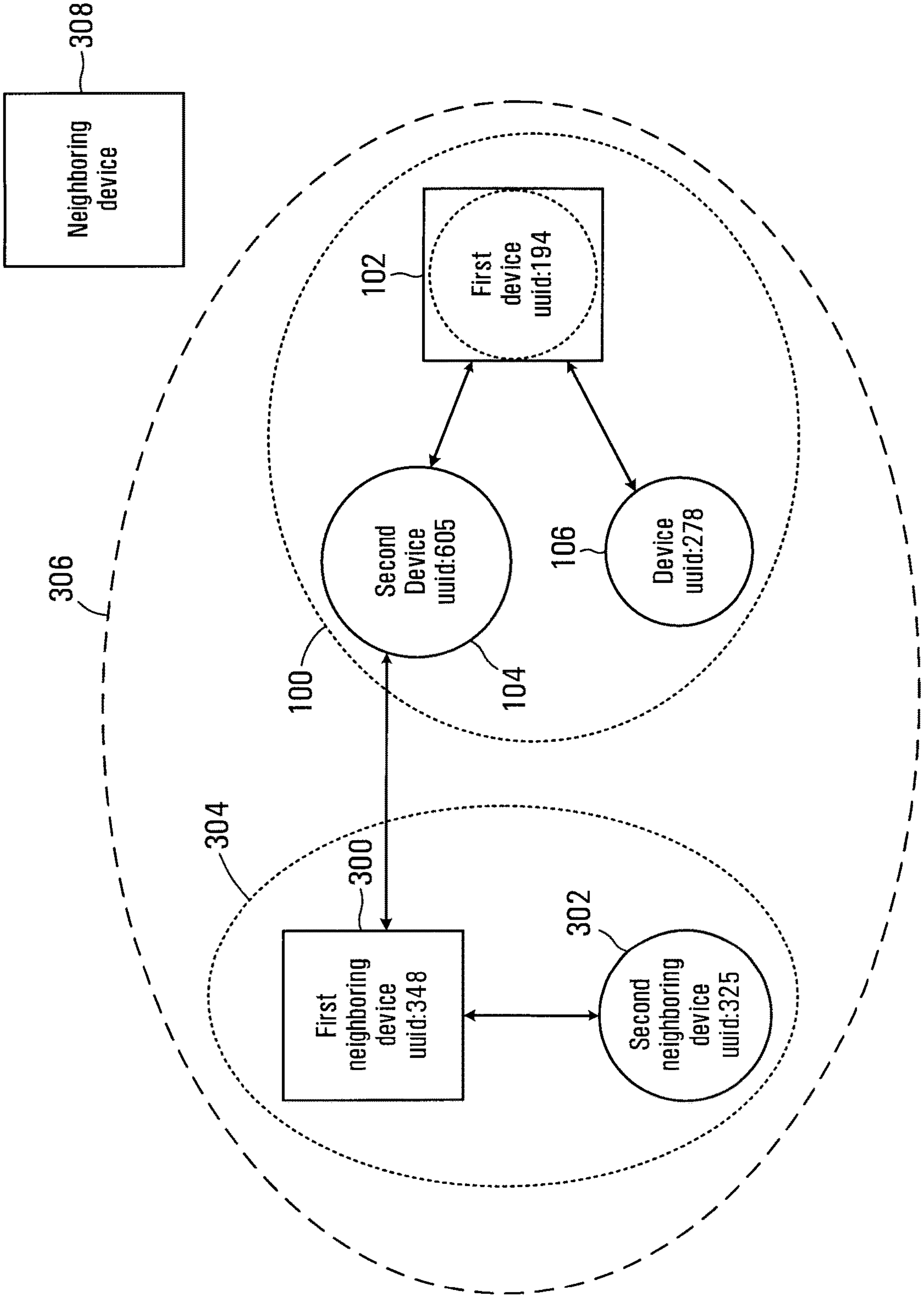
FIG. 3 is a further schematic depiction of the network cluster shown in FIG. 1.

The network cluster 100 is shown schematically in FIG. 3. Referring to FIG. 3, the first device 102 is depicted as a rectangle, indicating that the device is configured in access point mode. The second device 104 and the device 106 are depicted using circles indicating that these devices are configured in client mode. The first and second devices 102 and 104 and the third device form the network cluster 100. The first device 102 has a user identifier (uuid) 194, the second device 104 a user identifier 605, and the third device a user identifier 348. The user identifier should generally be unique to the device and may be generated using identifiers that are uniquely assigned to the device such as a telephone number, a media access control address (MAC) and/or an International Mobile Station Equipment Identity (IMEI) number for the device. The user identifiers shown in FIG. 3 are thus simplified for sake of illustration, but would in practice be significantly longer strings to support uniqueness.

Figure 4:
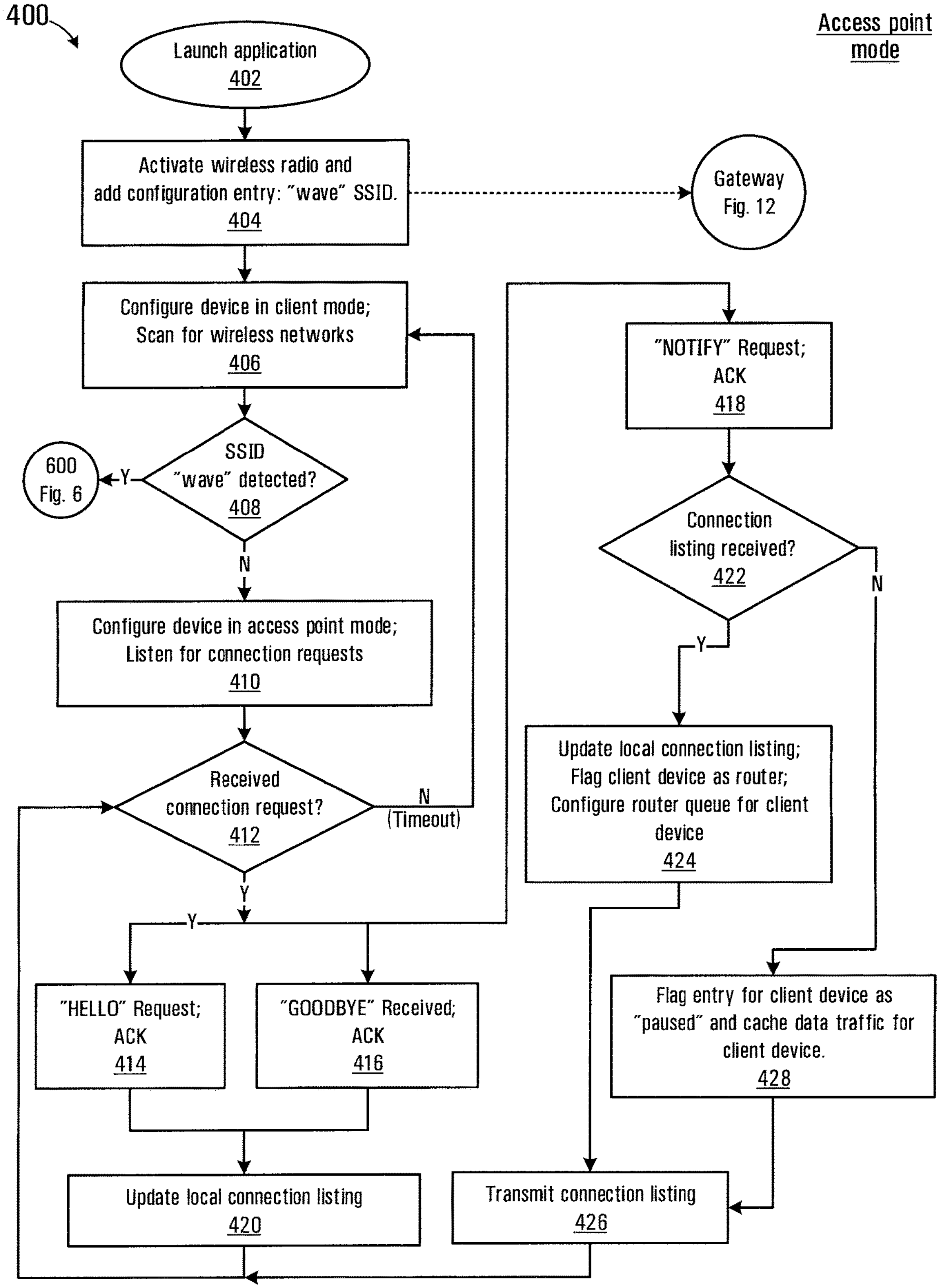
FIG. 4 is a process flowchart depicting blocks of code for directing the processor circuit of FIG. 2 to perform functions related to establishing the cluster network shown in FIG. 3.

Referring to FIG. 4, a process flowchart depicting blocks of code for performing functions related to establishing the cluster network 100 is shown at 400. The blocks generally represent codes that may be read from the application storage location 242 of the non-volatile flash memory 210 for directing the microprocessor 202 to perform various networking functions. The actual code to implement each block may be written in any suitable program language, such as Java, C, Objective-C, C++, C #, and/or assembly code, for example.

The cluster formation process 400 begins at block 402, when an application is launched that configures the first device 102 to provide functionality for establishing the network cluster 100. Block 404 then directs the microprocessor 202 to configure the device in client mode and if the wireless radio 216 is turned off, to activate the wireless radio. Block 404 also directs the microprocessor 202 to add or update an entry in the wireless configuration settings of the first device 102. The wireless configuration setting will generally be stored in a file in the system configuration memory location 248 of the non-volatile flash memory 210. An entry for the SSID "WAVE-*" is added or updated, which may include various configuration settings such as the security protocol in use and any user authentication information such as usernames and/or passwords, if in use. The updated configuration permits wireless connections to an access point having the "WAVE-*" SSID without further intervention of the user of the first device 102.

Following block 404 the microprocessor 202 may be optionally directed to execute a gateway process 1200 for determining whether the first device 102 is connected to a cellular data communications network via the RF baseband radio 212 or a wireless network via the wireless radio 216. The gateway process 1200 is described later herein.

The process 400 continues at block 406, which directs the microprocessor 202 to execute a scan for wireless networks. Block 408 directs the microprocessor 202 to determine whether network services under the SSID "WAVE-*" are being offered by any device. If at block 408 network services under the SSID "WAVE-*" are being offered by another device in range of the first device 102 then the device is able to connect to the other device and the first device executes a client process 600, which is described later herein.

If no device in range of the first device 102 is offering network services for the SSID "WAVE-*" then the process continues at block 410, which directs the microprocessor 202 to configure the first device 102 in access point mode and listen for connection requests. The first device 102 then offers wireless networking services for the SSID "WAVE-*" and block 412 directs the microprocessor 202 to determine whether a connection request is received from other devices, such as the devices 104 and 106 for example. If at block 412 no connection request is received within a timeout period, then the microprocessor 202 is directed back to block 406 and the first device 102 is configured back in client mode and scans for other devices offering network services for SSID "WAVE-*".

The first device 102 thus periodically alternates between being configured in the client mode and being configured in the access point mode until either a connection request is received while the first device is in access point mode or another device offering networking services associated with the network name is discovered while in client mode. In one embodiment the respective periods of time spent in client mode and access point mode may include a random time component such that when a plurality of devices are alternating between client mode and access point mode, eventually one device will be in access point mode while another is in client mode thus permitting establishment of the cluster network 100.

If at block 412 a connection request is received, then the microprocessor 202 is directed to one of blocks 414, 416, or 418 depending on the content of the request received. In one embodiment, connection requests may take the form of "HELLO" type requests for new connections, "GOODBYE" type requests for termination of an existing connection, and "NOTIFY" type requests that notify the first device 102 of a change in status for a connected device. If at block 412 a "HELLO" type request is received, for example from the second device 104, the first device 102 transmits an acknowledgement (ACK) message back to the second device to acknowledge receipt of the message.

Block 420 then directs the microprocessor 202 to update the connection listing stored on the first device 102. An example of the connection listing stored on the first device 102 is shown in a tabular format at 500 in FIG. 5. A similar example of a connection listing that may be stored on the second device 104 is shown at 520. Referring to FIG. 5, the connection listing 500 includes a plurality of fields 502, including a uuid field for storing a user identifier associated with the entry, an addr field for storing an internet protocol (IP) address as a dotted octet for the associated device, a nexthop address for storing an IP address of a next hop for routing data, two Boolean fields related to whether the device is in access point mode (isMaster) or whether the device is in client routing mode (isRouter), a "lastheard" field for storing a time when the associated device was last communicated with, and a hardware address (hwAddress) field for storing a hardware identifier associated with the device. The connection listing 500 includes first and second entries 504 and 506 for the first device 102 itself, which in this embodiment has an assigned uuid 194. The first device 102 has been assigned two different IP addresses as reflected in entry 504 and 506. The isMaster field is set to TRUE indicating that the first device 102 is currently configured in access point mode. The isRouter field is set to FALSE, since in this embodiment only client mode configured devices are considered to be routers. The hwAddress for the entries 504 and 506 reflect the hardware identifier of the first device 102.

The connection listing 500 also includes an entry 508 for the second device 104, which is added at block 420 by the first device 102 in response to receiving a HELLO request from the second device that includes the user identifier 605, the IP address, and the hardware address of the second device. The entry 508 for the second device 104 thus has an ipaddr as reflected in entry 508 and the isMaster field is set to FALSE indicating that the second device 104 is currently configured in client mode. The isRouter field is set to FALSE since in this embodiment the second device 104 is not in router mode, as will be described later herein. The hwAddress field for the entry 508 stores the hardware identifier of the second device 104. Once the connection listing 500 has been updated, block 420 directs the microprocessor 202 back to block 412 to await further requests.

If at block 412, the received request is a GOODBYE request then a device (such as the device 104 or 106 in FIG. 3) is notifying the first device 102 that it is about to disconnect from the network cluster 100. In this case, block 416 directs the microprocessor 202 to transmit an acknowledgement to the device. Block 420 then directs the microprocessor 202 to remove any entries in the connection listing 500 associated with the device. For example, if a GOODBYE request is received from the second device 104, the first device 102 would delete the entry 508 in the connection listing 500. Block 420 then directs the microprocessor 202 back to block 412 to await further requests.

The NOTIFY request handling process (blocks 418 and 422-428) will be described later herein. In general, each of the devices 102, 104, and 106 that are in range execute at least the blocks 402-408 of the cluster formation process 400, whereafter the devices selectively configure in either access point mode of client mode. For example, for the second device 104, at block 408 a network may already be in existence (i.e. offered by the first device 102). In this case when block 408 directs the microprocessor 202 of the second device to determine whether any devices offering network services for the SSID "WAVE-*", the network being hosted by the first device 102 in access point mode would be detected and block 408 would direct the microprocessor to execute a client process.

Figure 6:
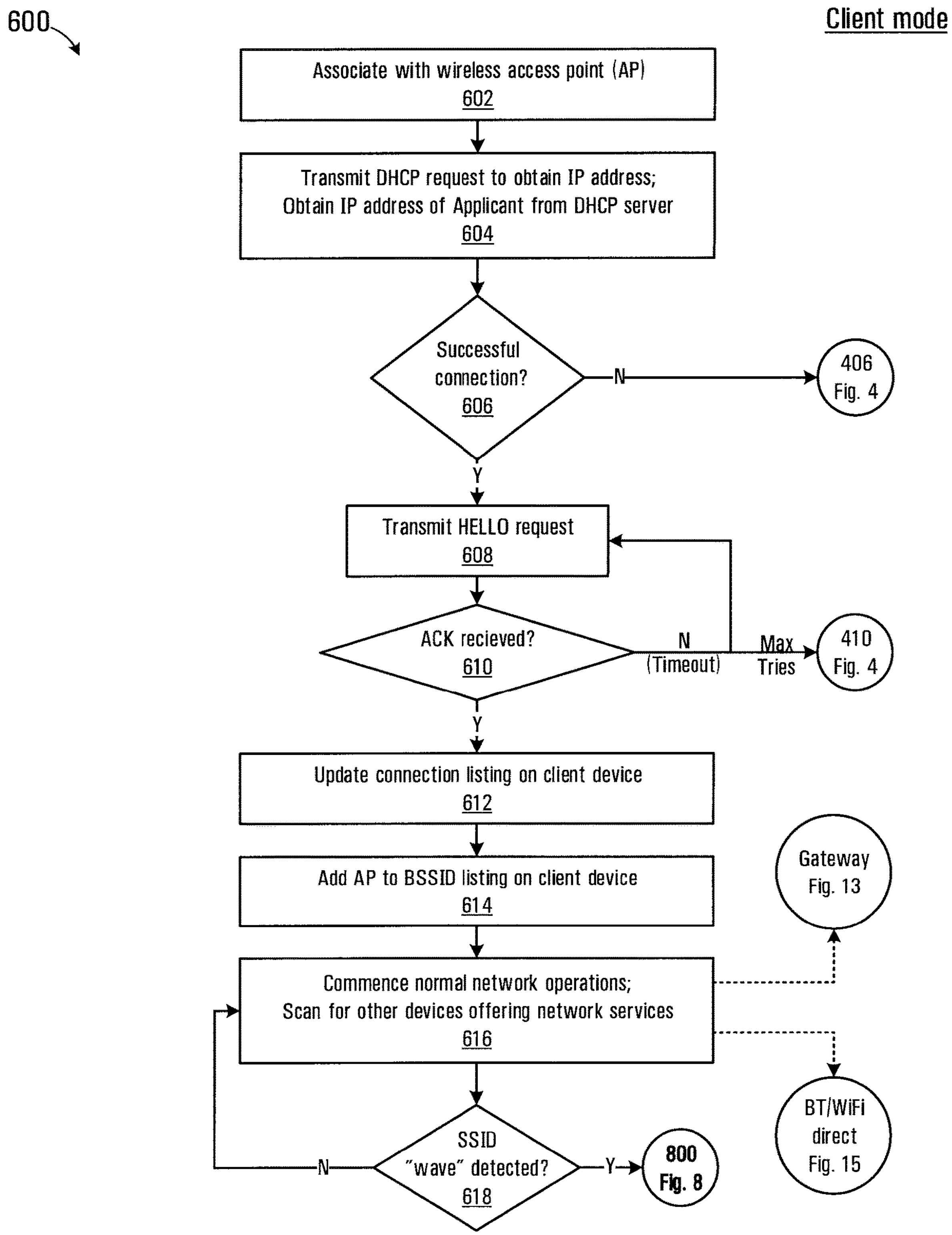
FIG. 6 is a process flowchart depicting blocks of code for directing the processor circuit of FIG. 2 to perform client process functions.

Referring to FIG. 6, an embodiment of the client process is shown generally at 600. The process begins at block 602, which directs the microprocessor 202 to associate with the first device 102 in access point mode. For an IEEE 802.11 protocol, association involves an exchange of messages between the client device 104 and the access point device 102 and establishes a connection at a data link layer. The network cluster 100 is subsequently established at a network layer that relies on the data link layer established during the association process. Establishment of the network cluster 100 continues at block 604, which directs the microprocessor 202 to transmit a Dynamic Host Configuration Protocol (DHCP) request to the first device 102 for requesting assignment of an IP address to the second device 104. In this embodiment, the first device 102 implements a DHCP server, which assigns an IP address from a pool of IP Address to the second device 104. Block 604 also directs the microprocessor 202 to determine the IP address for the first device 102. When the DHCP server running on the first device 102 receives an IP address lease request from the second device 104, the DHCP server reserves an IP address for the second device and makes a lease offer by transmitting a message to the client that includes the second device's MAC address, the IP address that the DHCP server is offering, the subnet mask, the lease duration, and the IP address of the DHCP server making the offer. The DHCP lease offer transmission to the second device 104 thus provides the IP address of the first device 102 to the second device.

The process 600 then continues at block 606, which directs the microprocessor 202 to determine whether a successful network connection has been established between the second device 104 and the first device 102. A successful network connection requires a successful association with the access point, receiving an assigned IP address, and receiving the IP address of the first device 102. If the connection is successfully completed, block 606 directs the microprocessor 202 to block 608, which directs the microprocessor to transmit a HELLO request to the first device 102. Blocks 602 and 604 thus effectively involve association and connection processes, which will be referenced as such in further flowcharts set forth herein.

An example of a generic request and/or response message in Google's "proto2" protocol buffer syntax for serializing structured data is shown at 700 in FIG. 7. Referring to FIG. 7, the request/response message protocol 700 includes a plurality of fields 702, each having a type, a name and a unique numbered tag. The field is also prefaced by a rule indicating whether the field is "required" (message must have exactly one of this field), "optional" (zero or one of this field), and "repeated" (field may be repeated zero to any number of times). Several types are pre-defined in the syntax, such as uint64 (an unsigned 64 bit integer), uint 32 (an unsigned 32 bit integer), and bytes (an arbitrary sequence of bytes). As an example a type field 704 (i.e. having the name "type") is "required", has a type of "RequestType", and is assigned the tag "1". The "RequestType" type is defined in an enumeration 722 setting out a pre-defined list of possible values that are assigned to the various message types such as HELLO, GOODBYE and NOTIFY, described above in general terms.

A HELLO request would thus require a type field 704 of 1 and a uuid field 706 corresponding to the transmitting device user identifier. The HELLO request may also include zero, one, or more addr fields 708 holding a list of IP addresses of the transmitting device. A transmitting device may not be connected to any other networks or devices in access point mode, in which case no addresses would be transmitted in the HELLO request. However, in other embodiments the transmitting device may be connected to another device in access point mode, another local network such as a Bluetooth® or an IEEE 802.11 WLAN local network, and/or a cellular data network via the RF baseband radio 212 shown in FIG. 2. Each of these networks will generally provide the transmitting device with an IP address that is included in the addr fields 708 and transmitted to the first device 102. The HELLO request transmitted at block 608 by the second device 104 would thus include values [1,605,192168000010]. Block 610 then directs the microprocessor 202 to determine whether an acknowledge message (ACK) has been received back from the first device 102 in response to the HELLO message. The ACK message would include values [9,194,1] corresponding to a type field of ACK, the uuid 194 being for the first device 102, and an ack field including the RequestType for the HELLO message. If an ACK message including the values above is not received within a timeout, then block 610 directs the microprocessor 202 back to block 608 and the HELLO message is retransmitted. If the timeout occurs more than a predefined maximum number of times, then block 610 may direct the microprocessor 202 to abandon the connection to the first device 102 and direct the microprocessor back to block 410 of the cluster formation process 400 in FIG. 4.

If an ACK message including the values above is received within the timeout, then block 610 directs the microprocessor 202 to block 612. Block 612 directs the microprocessor 202 to update the connection listing stored on the second device 104. Referring back to FIG. 5, the connection listing 520 for the second device 104 includes a plurality of fields 522 that correspond to the plurality of fields 502 for the connection listing 500. The connection listing 520 includes first and second entries 524 and 526 for the second device 104 itself, which in this embodiment has an assigned uuid 605. The second device 104 has also been assigned two different IP addresses as reflected in entries 524 and 526. The isMaster field is set to FALSE indicating that the second device 104 is currently configured in client mode. The isRouter field is set to FALSE since the second device 104 is not yet placed in router mode. The hwAddress for the entries 524 and 526 reflect the hardware identifier of the second device 104. Block 612 thus directs the microprocessor 202 to add an entry 528 to the connection listing 520, which includes the uuid 194 for the first device 102, the ipaddr and nexthop IP addresses for the first device, indications that the first device is in access point mode and not a router, and the hwAddress of the first device.

The client process 600 then continues at block 614, which directs the microprocessor 202 to add the first device 102 to the connected access point listing 250 stored in the non-volatile flash memory 210 (shown in FIG. 2). Since multiple devices in access point mode may be offering network services on the same SSID "WAVE-*" additional information is required to uniquely identify each access point device. In one embodiment, a basic service set identification (BSSID) is used to uniquely identify different access points offering network services on the SSID "WAVE-*". The connected access point listing 250 in non-volatile flash memory 210 is used to store the uuid and BSSID value for connected access points. The BSSID is a unique media access control (MAC) address assigned to the device and is transmitted in all wireless data packets. Referring back to FIG. 3, an example of a connected access point listing is shown at 540. The connected access point listing 540 includes two fields 542, including a uuid field for storing a user identifier associated with the entry and a hwAddress or BSSID field for storing the BSSID identifier for the access point device. Block 614 thus directs the microprocessor 202 of the second device 104 to add an entry 544 for the first device 102.

The second device 104 and the first device 102 are thus connected and form the network cluster 100, and block 612 directs the microprocessor 202 to block 616. Block 616 directs the microprocessor 202 to commence normal operations using the network cluster 100 such as searching for other devices, transmitting text, audio, image files, video and other content between devices in the network cluster 100.

Block 616 also directs the microprocessor 202 to continue to scan for other devices offering network services for the SSID "WAVE-*". Referring to FIG. 3, the second device 104 may be in connection range of both the first device 102 and a first neighboring device 300 also configured in access point mode. The first neighboring device 300 may be out of range of the first device 102 and would not be detected in a scan by the first device 102. When the second device 104 detects the first neighboring device 300, the second device attempts to link the first neighboring device to the network cluster 100 to form a merged network cluster 306. The second device 104 first requests an updated connection listing from the first device 102. The second device 104 then disconnects from the first device 102, connects to the first neighboring device 300, and requests a connection listing including user identifiers of devices that are connected to the first neighboring device. The second device 104 also provides the connection listing for the first device to the third device to facilitate updating of the connection listing on the third device. Finally the second device 104 reconnects with the first device 102 and provides the connection listing for the first neighboring device 300 to the first device to facilitate updating of the connection listing on the first device. Each of the first device 102 and first neighboring device 300 are thus updated to reflect device uuids that are connected to each other to facilitate routing between devices in the merged network cluster 306. For example, if a second neighboring device 302 had already formed a network cluster 304 with the first neighboring device 300, the neighboring network cluster and the network cluster 100 would be merged to form the merged network cluster 306. If the device 106 in the network cluster 100 wishes to send data to the second neighboring device 302, the first device 102 would be aware of the second neighboring device and would be able to forward data via the first device 102, the second device 104, and the first neighboring device 300 to the second neighboring device.

The above process is described in more detail with further reference to the client process 600 in FIG. 6. Referring back to FIG. 6, block 618 directs the microprocessor 202 to determine whether any detected neighboring device (i.e. other than the device 102) is configured in access point mode and offering network services associated with the SSID "WAVE-*". Since the network cluster 100 is formed on the basis of the SSID "WAVE-*" the second device 104 would not be able to discriminate between devices in access point mode offering services for the SSID "WAVE-*" and would need to determine whether BSSID for the devices differ. Block 618 thus further directs the microprocessor 202 to read the BSSID in a received data packet and to compare the BSSID value with the BSSID stored for the first device 102 in the entry 544 in the connected access point listing 540.

Figure 8A:
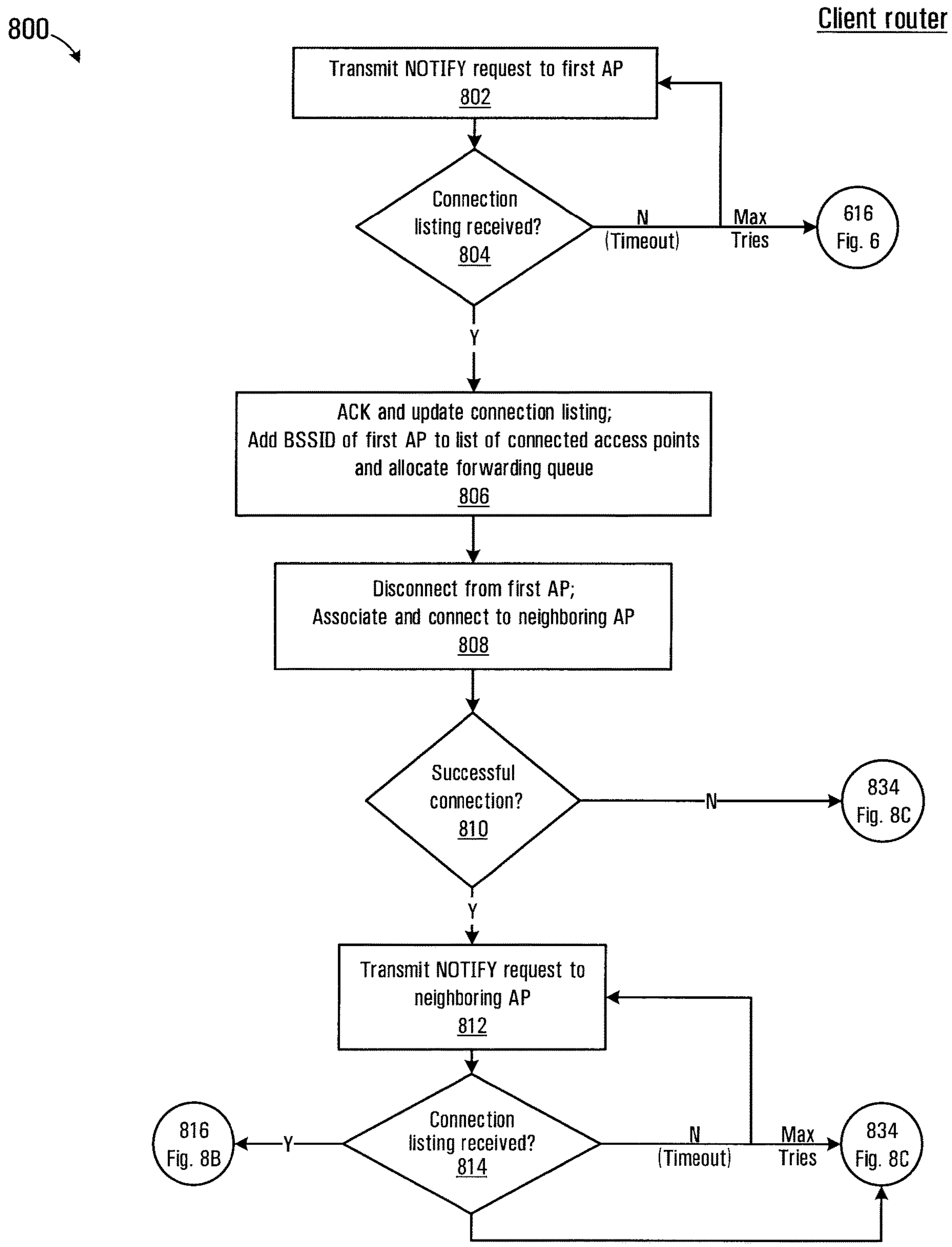
FIG. 8A-8C are a series of process flowcharts depicting blocks of code for directing the processor circuit of FIG. 2 to perform client router process functions.
Figure 8B:
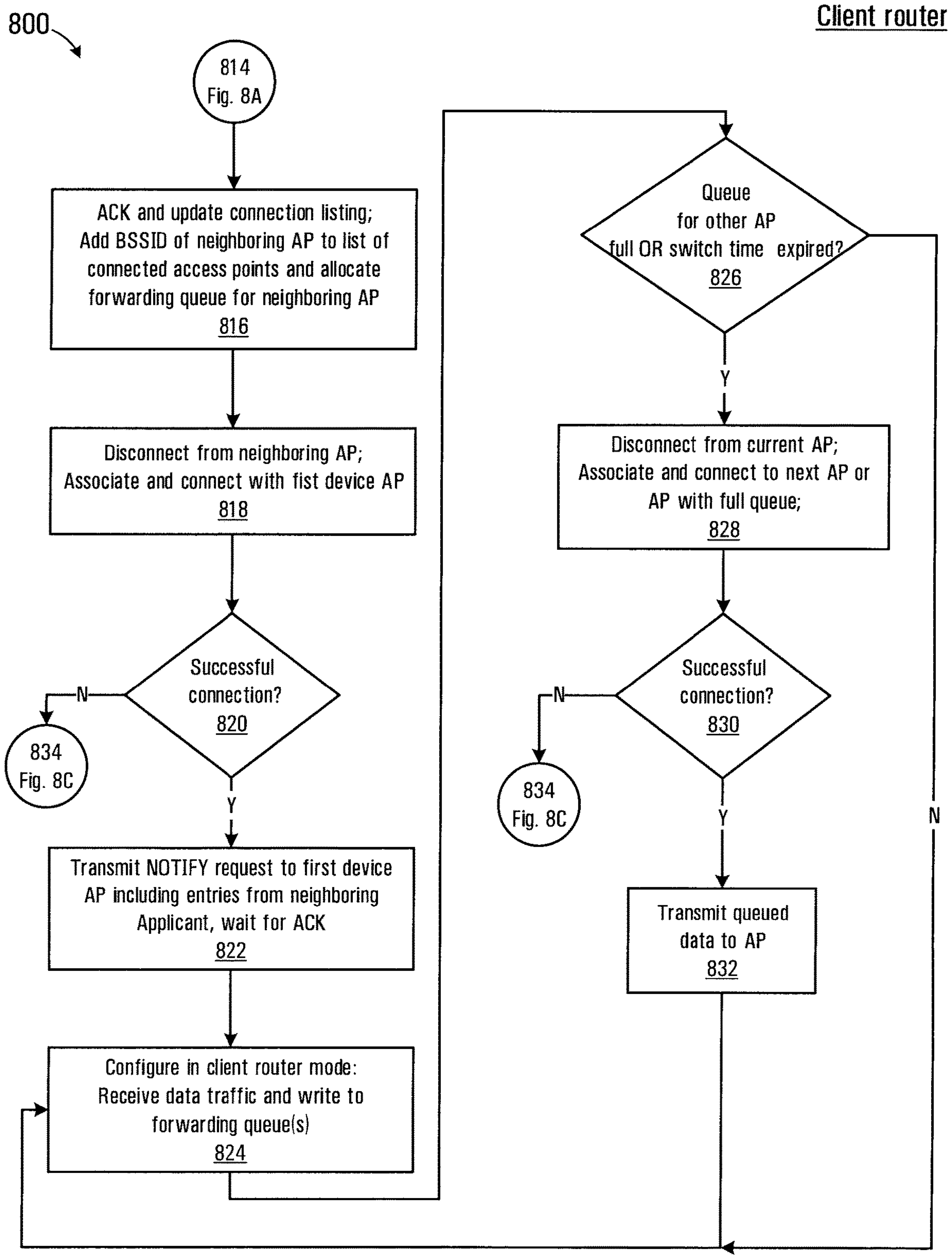
Figure 8C:
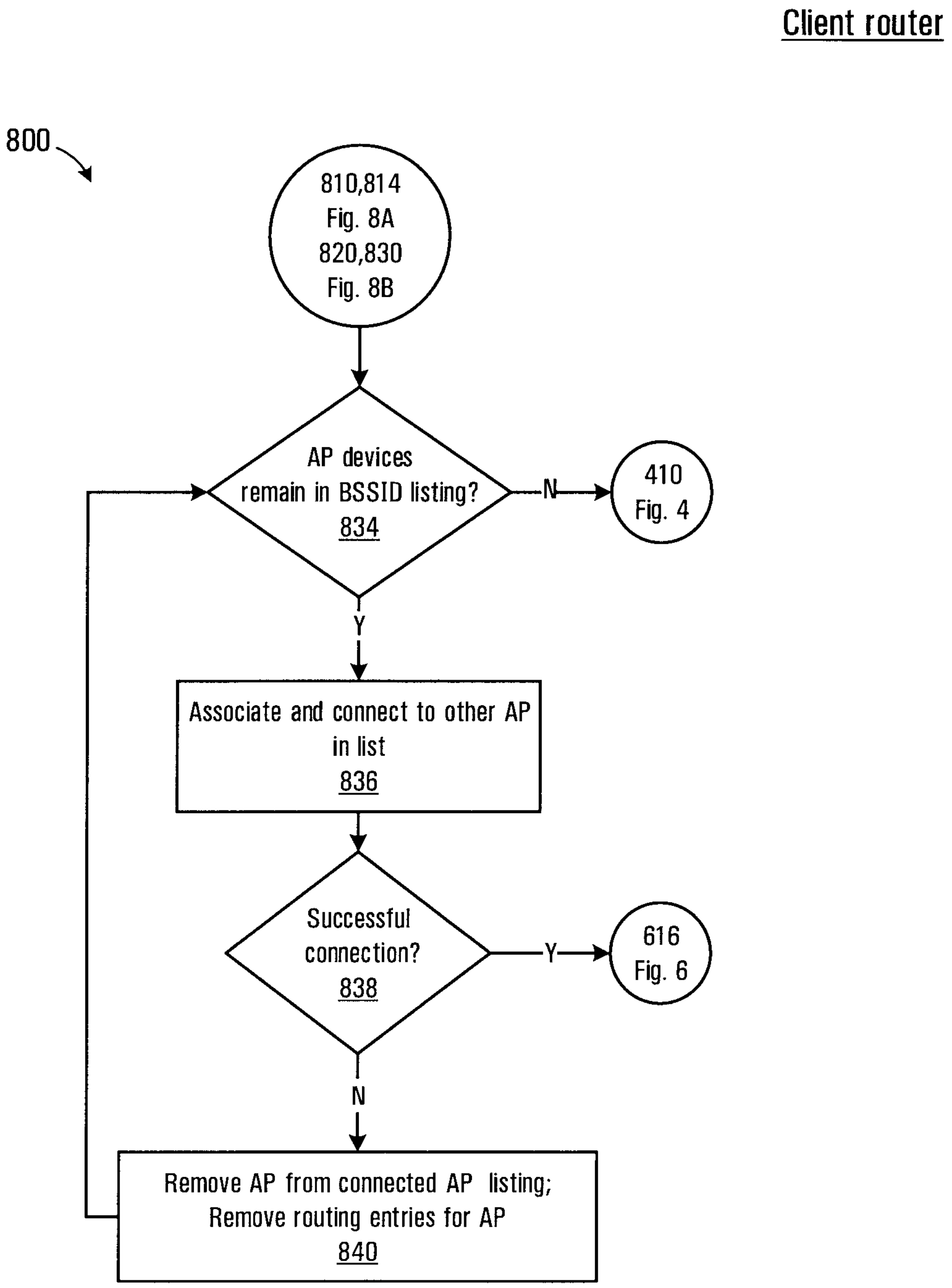

If at block 618 no neighboring devices are detected offering network services for SSID "WAVE-*" then normal operation of the network cluster 100 continues at block 616. If at block 618 a neighboring device is offering network services for SSID "WAVE-*" the microprocessor is directed to execute a client router process 800 described below in connection with FIG. 8. Referring back to FIG. 3, a first neighboring device 300 is shown in range of the second device 104 but not necessarily in range of the first device 102. The client router process is shown in FIGS. 8A-8C. Referring to FIG. 8A, the process 800 begins at block 802, which directs the microprocessor 202 to transmit a NOTIFY request to the first device 102. Referring back to FIG. 6 a NOTIFY request in accordance with the message protocol 700 includes the type field 704, the uuid field 706, and a peer field 716. The peer field 716 is used to hold a plurality of user identifiers for other devices that have been encountered by the second device 104 and the respective IP addresses for each device. The type for the peer message is peer and is defined at 724 as including a peer uuid and a list of IP addresses addr at which the device that the device can be reached at. The NOTIFY message transmitted at block 802 may thus include values [8,605], where peer field 716 has no values since no peer devices have yet been discovered on the network and the "repeated" nature of the field 716 does not require values.

Block 804 then directs the microprocessor 202 to determine whether a connection listing has been received from the first device 102 in a NOTIFY response elicited through transmission of the NOTIFY request at block 802. If a NOTIFY response is not received from the first device 102 after a timeout then block 804 directs the microprocessor 202 back to block 802 and the NOTIFY request is retransmitted. If at block 804 a predefined maximum number of tries is reached then block 804 directs the microprocessor 202 back to block 616 and normal operations recommence. If at block 804 the NOTIFY response is received from the first device 102 then the process 800 continues at block 806. The NOTIFY response has the same protocol as the NOTIFY request. Block 806 directs the microprocessor 202 to acknowledge the NOTIFY request in an ACK response [9,605,8]. In this case the second device 104 is not yet configured as a router, but is in the process of doing so. Block 806 also directs the microprocessor 202 to update the connection listing 520 to add any peer devices contained in the NOTIFY response and not already reflected in the connection listing on the device 104. In this embodiment, when the second device 104 encounters a second device in access point mode such as the first neighboring device 300, a listing of BSSID's for access point devices is created and block 806 directs the microprocessor 202 to add the first device 102 BSSID to the listing.

Block 808 then directs the microprocessor 202 to disconnect from the first device 102 in access point mode (first AP) and to connect to the first neighboring device 300. Block 808 also directs the microprocessor 202 to associate and connect with the first neighboring device 300 (neighboring AP). As disclosed above in connection with blocks 602 and 604, the association involves establishing a wireless link at the data link layer and connection involves connecting at the network layer i.e. obtaining an IP address from a DHCP server running on the first neighboring device 300 and obtaining the IP address of the first neighboring device.

The client router process 800 then continues at block 810, which directs the microprocessor 202 to determine whether a successful network connection has been established. If at block 810 the network connection is not successfully completed then the microprocessor 202 is directed to block 834 in FIG. 8C, which is described later herein.

If at block 810 the network connection is successfully completed then the microprocessor 202 is directed to block 812, which directs the microprocessor to transmit a NOTIFY request to the first neighboring device 300. In this case the NOTIFY request would include the values [8,605, 194,192168000001], i.e. the type NOTIFY, the uuid 605 of the second device 104, and the uuid 194 and addr of the first device 102. If additional peer devices were included in the original NOTIFY response received from the first device 102 at block 804 then further uuid and addr values would follow the uuid and addr of the first device in the NOTIFY request.

Referring back to FIG. 4, the first neighboring device 300 will be executing the cluster formation process 400 and at block 418 when a NOTIFY request is received from the second device 104, the first neighboring device will acknowledge the request with an ACK message. Block 422 then directs the microprocessor 202 of the first neighboring device 300 to determine whether a connection listing is contained within the NOTIFY message. If at block 422 a connection listing is included, then the microprocessor 202 is directed to block 424, which causes the microprocessor to update the connection listing stored on the first neighboring device and to flag the second device 104 as a router (i.e. the isRouter field for the second device is set to TRUE). Additionally block 424 also directs the microprocessor 202 to allocate a queue within the queue location 246 in the non-volatile flash memory 210 (FIG. 2) for the second device 104 for holding data packets that are to be routed through the second device while the second device is connected to another device in the network. Block 426 then directs the microprocessor 202 to transmit a connection listing of the first neighboring device 300 to the second device 104.

If at block 422 a connection listing is not included, then the NOTIFY message is interpreted by the first neighboring device 300 to be notification that the second device 104 is about to disconnect and associate with another device in access point mode (in this case the first device 102) and the process continues at block 428. Block 428 directs the microprocessor 202 to flag the entry in the connection listing stored on the first neighboring device 300 as "paused". Under these conditions data traffic for the second device 104 is cached in the router queue 246 for the device until the device reconnects to the first neighboring device. Block 428 also directs the microprocessor 202 to block 426, which directs the microprocessor 202 to transmit a connection listing for the first neighboring device 300 to the second device 104.

The process 800 continues at block 814 (FIG. 8A), which directs the microprocessor 202 of the second device 104 to determine whether the connection listing transmitted by the first neighboring device 300 (block 426, FIG. 4) has been received. If the connection listing is not received before expiry of a timeout, block 814 directs the microprocessor 202 back to block 812 and the NOTIFY request is retransmitted. If after the maximum number of tries the connection listing has still not been received block 814 directs the microprocessor 202 to block 834 in FIG. 8C.

If at block 814 the connection listing is received, then the microprocessor 202 is directed to block 816 shown in FIG. 8B. Block 816 directs the microprocessor 202 to acknowledge receipt of the NOTIFY response and update the connection listing on the second device 104. Referring back to FIG. 5, the connection listing 520 on the second device 104 includes a new entry 530 for the first neighboring device 300 which has a user identifier of 348 and an IP address of 192.168.10.1. The entry 530 also lists the nexthop for the first neighboring device 300 as it's IP address and the isMaster field indicates that the device is in access point mode.

Block 816 also directs the microprocessor 202 to add the first neighboring device 300 to the listing of connected access point BSSIDs and to allocate a forwarding queue for the first neighboring device 300 in the queue location 246 of the non-volatile flash memory 210 shown in FIG. 2. The process 800 then continues at block 818, which directs the microprocessor 202 to disconnect from the first neighboring device 300 and to associate and reconnect with the first device 102. If the reconnection with the first device 102 is not successful, then block 820 directs the microprocessor 202 to block 834 in FIG. 8C. If however the reconnection is successful, block 820 directs the microprocessor 202 to block 822, where the second device 104 transmits entries associated with other devices connected to the first neighboring device 300 back to the first device 102 for updating the connection listing on the first device. Accordingly, block 822 directs the microprocessor 202 of the second device 104 to transmit a NOTIFY request to the first device 102. The NOTIFY request may include the peer field 716 having user identifiers and associated IP addresses for other devices (if any), connected to the first neighboring device 300. The first device 102 on receiving the NOTIFY request would set the isRouter field in the entry 508 for the second device 104 to "TRUE", indicating that the device is now configured in client router mode. Block 822 also directs the microprocessor 202 to wait for acknowledgement of the NOTIFY request.

At this stage in the client router process 800 the second device 104 has associated with two devices in access point mode (the first device 102 and the first neighboring device 300) and has exchanged current connection listings between the devices such that each access point device is aware of not only the devices connected to the respective access points, but also devices connected to other access points. The updated connection listing on the first device 102 thus defines connections for a merged network cluster extending beyond the initial network cluster 100.

The client router process 800 continues at block 824, which directs the microprocessor 202 to configure the second device 104 in a client router mode, where the device receives data traffic and writes the data to one or more of the forwarding queues allocated at block 806 for the first device 102 and at block 816 for the first neighboring device 300. Data traffic that is received will generally have a destination user identifier (uuid). The second device 104 determines whether the user identifier appears in the connection listing 520, and if found writes the data to the queue that corresponds to the value in the nexthop field i.e. an IP address of a device in access point mode that may be used to reach the device associated with the user identifier.

The queues in the queue location 246 of non-volatile flash memory 210 may be allocated a limited memory size and may become full, particularly if heavy data traffic is received. In this embodiment, a switch time is also defined for switching between devices in access point mode regardless of whether the queue is full. If at block 826 the allocated queues are not full and the switch time has not expired, the microprocessor 202 is directed back to block 824 and the second device 104 continues routing operations. If at block 826 any of the allocated queues are full or the switch time has expired, the microprocessor 202 is directed to block 828. Block 828 directs the microprocessor 202 to cause the second device 104 to disconnect from the current access point device (i.e. the first device 102) and to associate and connect to another access point device. For example if the queue for the first neighboring device 300 is full, the microprocessor 202 of the second device 104 is directed to connect to the first neighboring device. If the switch time expired, the microprocessor 202 may cause the second device 104 to connect to a next access point device appearing in the connection listing (i.e. identified by a TRUE value in the isMaster field in the connection listing 520. Block 830 then directs the microprocessor 202 to determine whether the connection was successfully completed, for example with the first neighboring device 300. If at block 830 the connection was not successfully completed, for example due to the first neighboring device 300 having moved out of range or disconnected from the network cluster 100, the microprocessor 202 is directed to block 834 in FIG. 8C. If at block 830 the connection was successfully completed the microprocessor 202 is directed to block 832 and the queued data for the first neighboring device 300 is transmitted and the microprocessor is directed to block 824. Router operation then continues at block 824, except that the second device 104 is now connected to the first neighboring device 300 and receives data traffic via the first neighboring device and writes the data to queues for other devices in access point mode, such as the first device 102.

The first neighboring device 300 may be connected to a plurality of devices in client mode, whether in client router mode or not. For example a second neighboring device 302 may be configured in client mode and connected to the first neighboring device 300. The first neighboring device 300 and second neighboring device 302 thus form a second neighboring network cluster 304 and the network cluster 100 and neighboring network cluster form a merged network cluster 306. If any other devices in access point mode are in range of the first device 102, such as a third neighboring device 308, the first device may also act as a router for these devices further extending the merged cluster network 306.

Referring to FIG. 8C, a portion of the client router process 800 is shown that handles unsuccessful connection to devices in access point mode and/or lack of response to a NOTIFY request (i.e. no connection listing received from the access point device) which may occur at blocks 810 and 814 in FIG. 8A and blocks 820 and 830 in FIG. 8B. The failure to connect or receive a response from a device in access point mode may be caused by the access point device having moved out of wireless range, the access point device having terminated the application (which was launched at block 402 in FIG. 4), or the access point device having switched into client mode, or some other communication failure. Block 834 directs the microprocessor 202 of the second device 104 to determine whether any other devices in access point mode remain in the connected access point listing. If the connected access point listing is empty, then block 834 directs the microprocessor 202 back to block 410 in FIG. 4 and the second device 104 is configured in access point mode and offers network services for SSID "WAVE-*".

If at block 834 there is still at least one access point remaining in the connected access point listing then the microprocessor 202 is directed to block 836, which causes the second device 104 to associate and connect with another access point device in the connected access point listing. Block 838 then directs the microprocessor 202 to determine whether the connection was successfully completed, in which case the microprocessor is directed to block 616 in FIG. 6 and normal network operations in client mode resume. If at block 838, the connection was not successfully completed then the process continues at block 840, which directs the microprocessor 202 to remove the entry in the connected access point listing for the access point device. Block 838 also directs the microprocessor to remove any routing entries in the connection listing 520 associated with the access point device, which would have a nexthop address corresponding to the removed access point device. Block 840 then directs the microprocessor 202 back to block 834 and blocks 834-840 of the process 800 are repeated. The second device 104 thus attempts to associate and connect with access point devices in the connected access point listing until an access point device is found that is still reachable or the connected access point listing is empty. When the connected access point listing is empty, the second device 104 no longer has any connection to the network cluster 100 and the device thus configures in access point mode to re-establish the network cluster.

Referring back to FIG. 3, the above disclosed embodiments detail functionality for the various devices in establishing the network cluster 100, neighboring network cluster 304, and merging the clusters to form the merged network cluster 306. Further network clusters may be merged to extend the merged network cluster 306 to include a plurality of devices connected over a wide area, where at least some devices are out of wireless range of other devices but are still reachable via the merged network cluster 306. Additional functionality related to locating specific devices on the merged network cluster 306 is described with reference to FIG. 9. For example the device 106 may wish to contact the second neighboring device 302. If the device 106 has previously encountered the second neighboring device 302 on the merged network cluster 306, there will be an entry for the second neighboring device (i.e. uuid 325) the connection listing stored on the device 106. If however there is no entry in the connection listing for the second neighboring device 302 the device 106 generates and transmits a FIND request to the first device 102 including information associated with the second neighboring device 302. Referring back to FIG. 7, the message protocol 700 includes a peerID field 710, which holds a value for a user identifier of the intended recipient device that it is desired to locate on the merged network cluster 306. The message protocol 700 also includes a discovery_type field 712, which together with a DiscoverType enumeration 726 optionally defines types of content that it is desired to discover on devices connected to the network cluster 100. The message protocol 700 further includes a limit field 714 limiting a number of hops (for example 8 hops) that should be searched in order to prevent the request from causing a repetitive looping discovery process. The peerID field 710 is prefaced by the rule "repeated" and may thus include several user identifiers that it is desired to contact, thus permitting simultaneous searching for a plurality of other devices by uuid. For contacting the second neighboring device 302 the FIND message would thus include values [5,278,325,0,8], where "5" is the FIND request type, the uuid is 278 for the device 106, and the uuid for the device being located is 325, and "0" defines the discovery type as being for another user on the network cluster 100, and the limit being set to "8".

Figure 9:
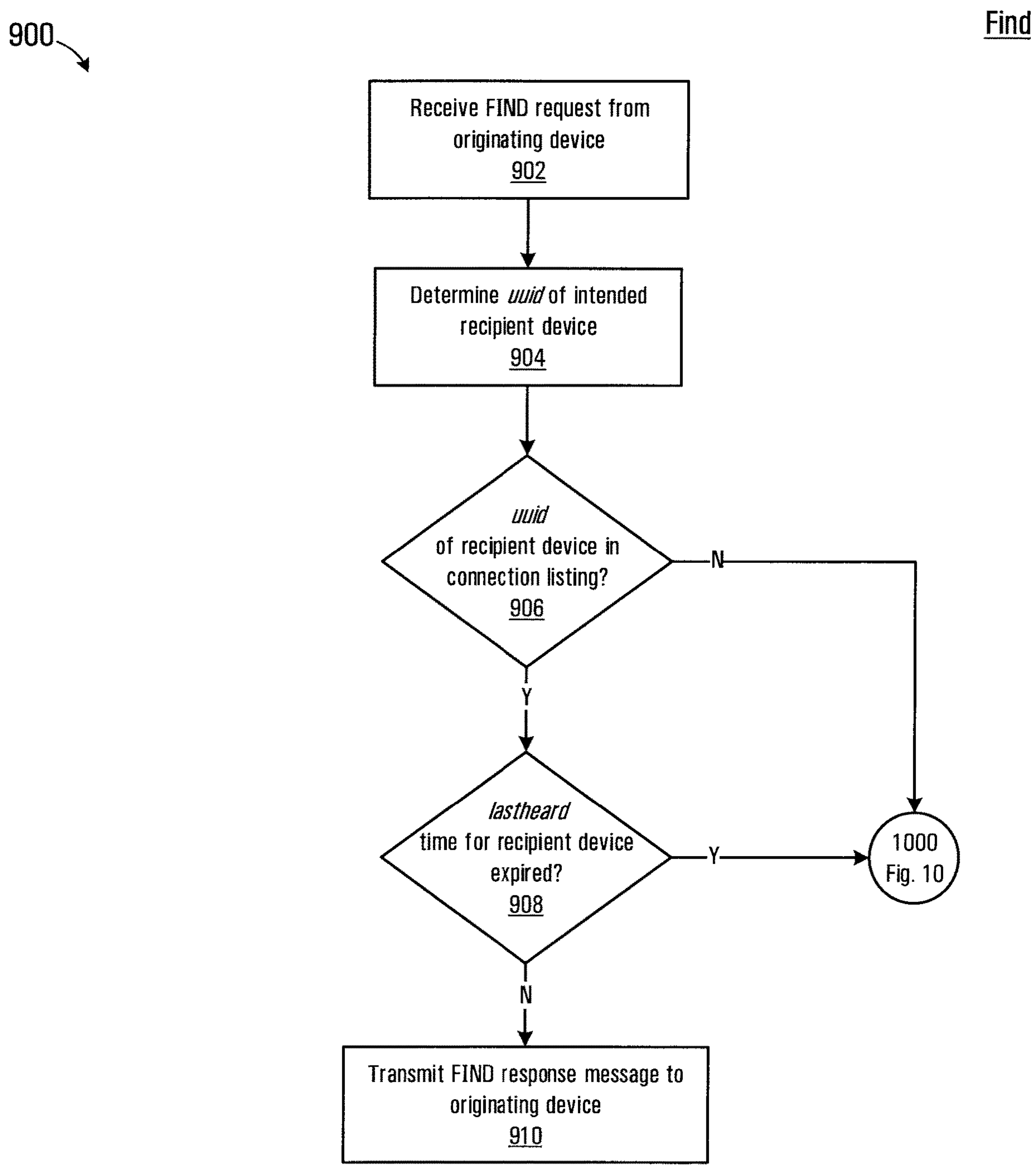
FIG. 9 is a process flowchart depicting blocks of code for directing the processor circuit of FIG. 2 to perform a find process.

Referring to FIG. 9, a process executed by the first device 102 for processing the FIND request is shown generally at 900. The find process 900 begins a block 902, which directs the microprocessor 202 of the first device 102 to receive the FIND request from the originating device 106, which is configured in client mode and connected to the first device.

Block 904 then directs the microprocessor 202 of the first device 102 to determine the uuid of the intended recipient device from FIND request. Block 906 then directs the microprocessor 202 to determine whether the uuid of the intended recipient device (i.e. second neighboring device 302 in this case) is in the connection listing 500. In this case the uuid 325 does appear at 512 in the connection listing 520 and block 906 directs the microprocessor 202 to block 908. Block 908 directs the microprocessor 202 to determine whether the lastheard time in the connection listing entry 512 (shown in FIG. 5) for the uuid 325 has expired. In one embodiment, an expiry time may be pre-defined for entries in the connection listing 520. Additionally, each device in access point mode may be configured to update the lastheard field to the current time when a message is received from a device having an entry in the connection listing. If at block 908 the lastheard time has expired for the uuid 325, the first device 102 initiates a process 1000 for discovering the route on the merged network cluster 306 to the second neighboring device 302. The process 1000 is described below with reference to FIG. 10. In one embodiment the expiry time may be configurable and may be in the range of about 10 minutes to 1 hour.

If at block 908, the lastheard time has not yet expired for the uuid 325, the process continues at block 910, which directs the microprocessor 202 to transmit a FIND response message to the device 106. In this case, the device having the uuid 325 having been recently encountered on the network cluster 100 may thus may be assumed to still be connected.

Referring to FIG. 7, the FIND response message in the message protocol 700 includes the type field 704, the uuid field 706, and a peer field 716. The peer field 716 is prefaced by the rule "repeated" and has a type defined at 724. Each peer field value thus includes a uuid and an IP address addr for routing data to the intended recipient device. For the second neighboring device 302 the FIND response would thus have values [6,194,325,192168000001], where the last value is the IP address of the first device 102 which represents the nexthop address for routing data to the second neighboring device 302. Referring back to FIG. 5, the entry 512 in the connection listing 500 for the first device 102 has the nexthop listed as 192.168.0.10 which is the IP address of the second device 104 acting as a client router. However at block 910, the first device 102 transmits its own IP address as the nexthop for transmission of data to the second neighboring device 302 since the device 106 must first transmit any data to the first device before it can be routed to the second neighboring device 302. When the device 106 receives the FIND response, its connection listing would be updated to include an entry for the second neighboring device 302. The device 106 thus saves the nexthop IP address of the first device 102 for transmitting to the second neighboring device 302.

Figure 10:
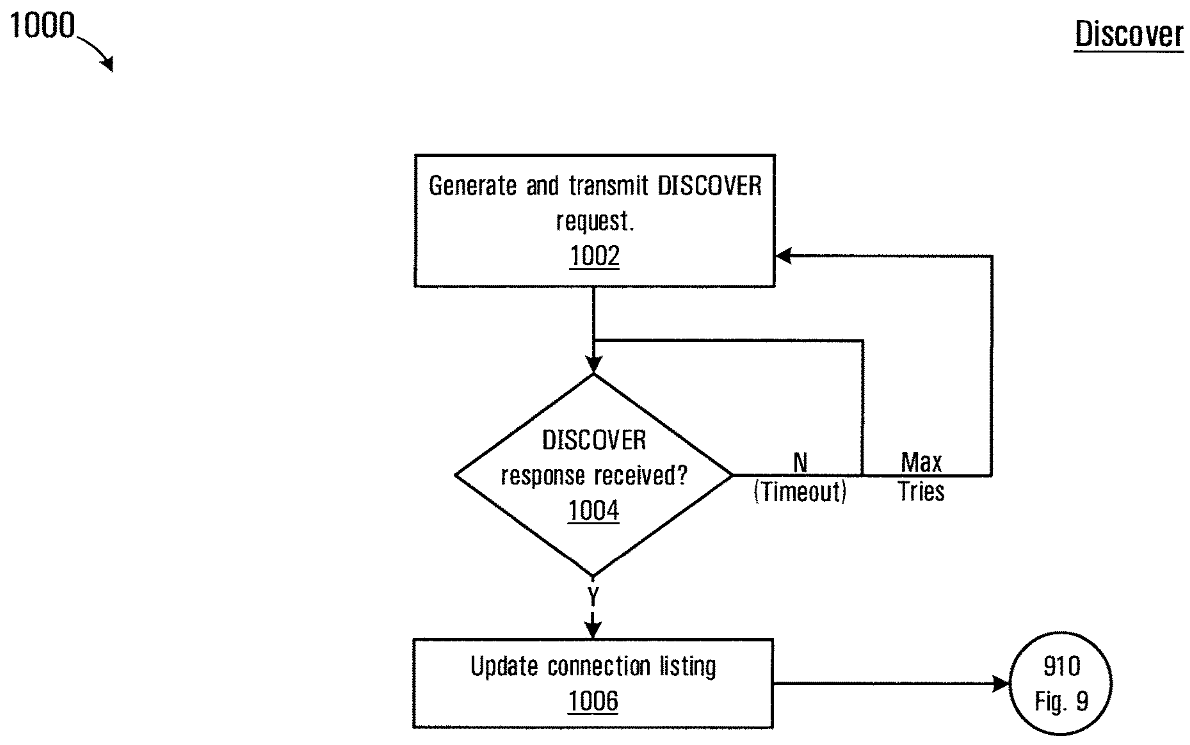
FIG. 10 is a process flowchart depicting blocks of code for directing the processor circuit of FIG. 2 to perform a route discovery process.

If at block 906, the uuid of the intended recipient device was not found in the connection listing 500, block 906 directs the microprocessor 202 to execute the process 1000 of FIG. 10 for discovering the route on the merged network cluster 306 to the second neighboring device 302. In the embodiment shown, the first device 102 had already received information for the second neighboring device 302 when the neighboring network cluster 304 and network cluster 100 were merged. However the remainder of the discussion proceeds is if the second neighboring device 302 had not been connected to the first neighboring device 300 when the clusters were merged and thus an entry 512 would not have been found in the connection listing 500.

Referring to FIG. 10, the route discovery process is shown in FIG. 10 at 1000. The process 1000 begins at block 1002, which directs the microprocessor 202 of the first device 102 to generate and transmit a DISCOVER request for locating the second neighboring device 302 on the merged network cluster 306. Referring back to FIG. 7, the DISCOVER request has the same syntax as the FIND request and includes the type field 704, uuid field 706, the peerID field 710, the discovery_type field 712, and the limit field 714. The DISCOVER request however differs in that it elicits a listing of all peers connected to an access point that receives the request. The FIND request is intended to search for a particular device or devices by uuid. The DISCOVER request may thus have the values [3,194,325,0,8] and the request is transmitted to all client devices connected to the first device 102 that have an isRouter flag set to true, which in turn forward the DISCOVER request to connected devices in access point mode. The DISCOVER request also has a timestamp included in the response which is used as a time-to-live (TTL) for the request. The process 1000 then continues at block 1004, which directs the microprocessor 202 of the first device 102 to determine whether a DISCOVER response has been received in response to the transmitted DISCOVER request. If a DISCOVER response has not yet been received, block 1004 directs the microprocessor 202 to continue awaiting a response for a timeout period whereafter the microprocessor is directed back to block 1002 and the DISCOVER request is retransmitted.

Figure 11:
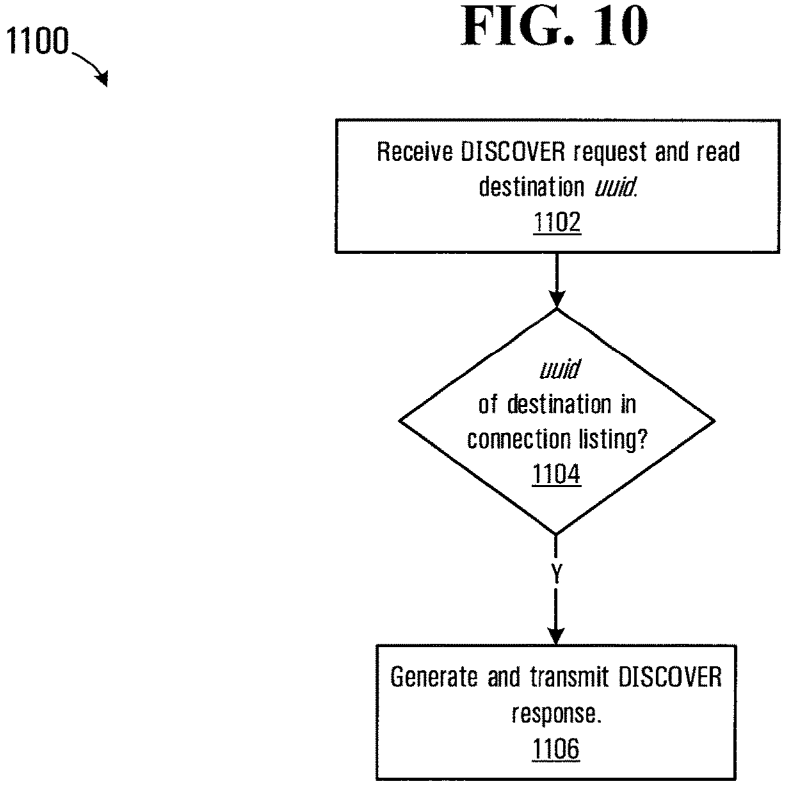
FIG. 11 is a process flowchart depicting blocks of code for directing the processor circuit of FIG. 2 to perform a discovery response process.

Referring to FIG. 11, each device that receives the DISCOVER request executes a process 1100. The discovery response process 1100 begins at block 1102, which directs the microprocessor 202 of the receiving device to receive the DISCOVER request and determine the destination uuid in the request. Block 1104 then directs the microprocessor 202 to determine whether an entry for the destination uuid is stored in the device connection listing. If an entry for the destination uuid exists then the process continues at block 1106, which directs the microprocessor 202 to generate and transmit a DISCOVER response. Referring to FIG. 7, the DISCOVER response has the same form as the FIND response and has the peer field 716 with a uuid value for the destination and an addr value. The addr value is set to the device's own address since the device responding to the Discover request has an entry for the second neighboring device 302 and thus will be able to route any data for the destination uuid based on the entry in the connection listing. The DISCOVER response is transmitted back to the originating device, i.e. the first device 102 in this case. In some cases the DISCOVER request will have traversed several client routers and access points, and to avoid requests becoming stale, the receiving device will examine the timestamp field and determine whether the request should be processed or not based on a pre-determined time-to-live (TTL). Similarly, the DISCOVER response when transmitted back to the originating device may traverse several client routers and access points and a timestamp is added to the response to prevent repetition of the discovery for the destination uuid within a predefined timeframe.

Referring back to FIG. 10, if at block 1004, the microprocessor 202 determines that a DISCOVER response corresponding to a previously transmitted DISCOVER request has been received, then the microprocessor is directed to block 1006. Block 1006 directs the microprocessor 202 to update the connection listing 500 on the first device 102 (shown in FIG. 5) to include an entry 512 for the second neighboring device 302 based on the DISCOVER response and including the current time as the lastheard time. Block 1006 then directs the microprocessor 202 to block 910 of the process 900, which causes transmission of a FIND response message to the device 106. The device 106 will then be able to reach the second neighboring device 302 on the merged network cluster 306.

Figure 12:
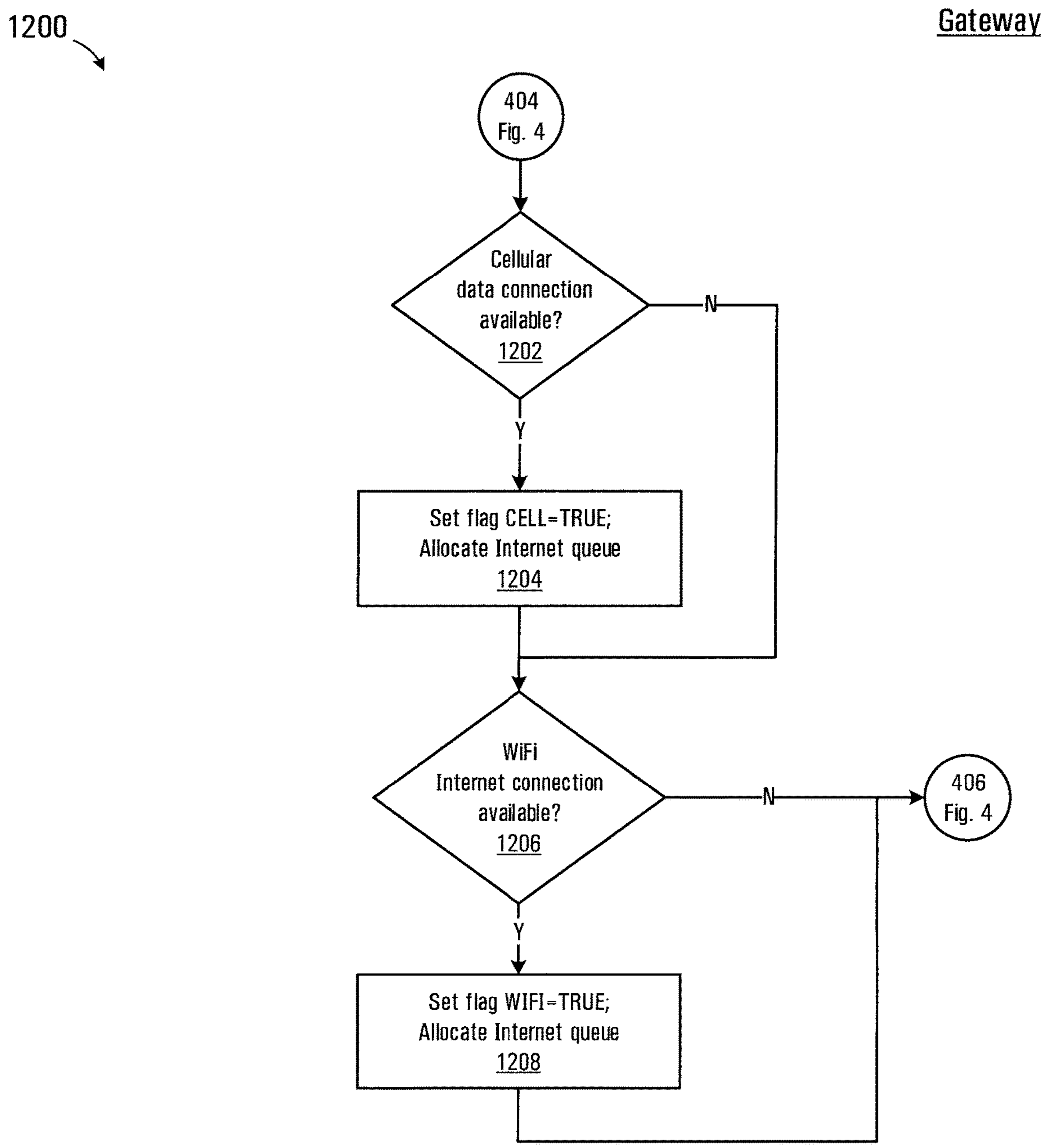
FIG. 12 is a process flowchart depicting blocks of code for directing the processor circuit of FIG. 2 to perform a first portion of a gateway process.

Referring back to FIG. 4, at block 404 a gateway process may be optionally executed by the first device 102. The gateway process enables connection to cellular data networks or other wireless access points not associated with the SSID "WAVE-*". Referring to FIG. 12, the gateway process is shown generally at 1200. The gateway process 1200 begins at block 1202, which directs the microprocessor 202 to determine whether a cellular data connection to the Internet is available on the device. If a cellular data connection is available, then block 1204 directs the microprocessor 202 to set a CELL flag in the system configuration location 248 of the non-volatile flash memory 210 to TRUE and to allocate an Internet queue in the queue location 246. The process then continues at block 1206, which directs the microprocessor 202 to determine whether a wireless (WiFi) data connection to the Internet is available on the device. If a WiFi data connection is available, then block 1208 directs the microprocessor 202 to set a WIFI flag in the system configuration location 248 of the non-volatile flash memory 210 to TRUE and to allocate an Internet queue in the queue location 246. Block 1208 then directs the microprocessor 202 back to block 406 of the process 400. If at block 1206, no WiFi connection is available, then block 1206 directs the microprocessor 202 back to block 406.

Figure 13:
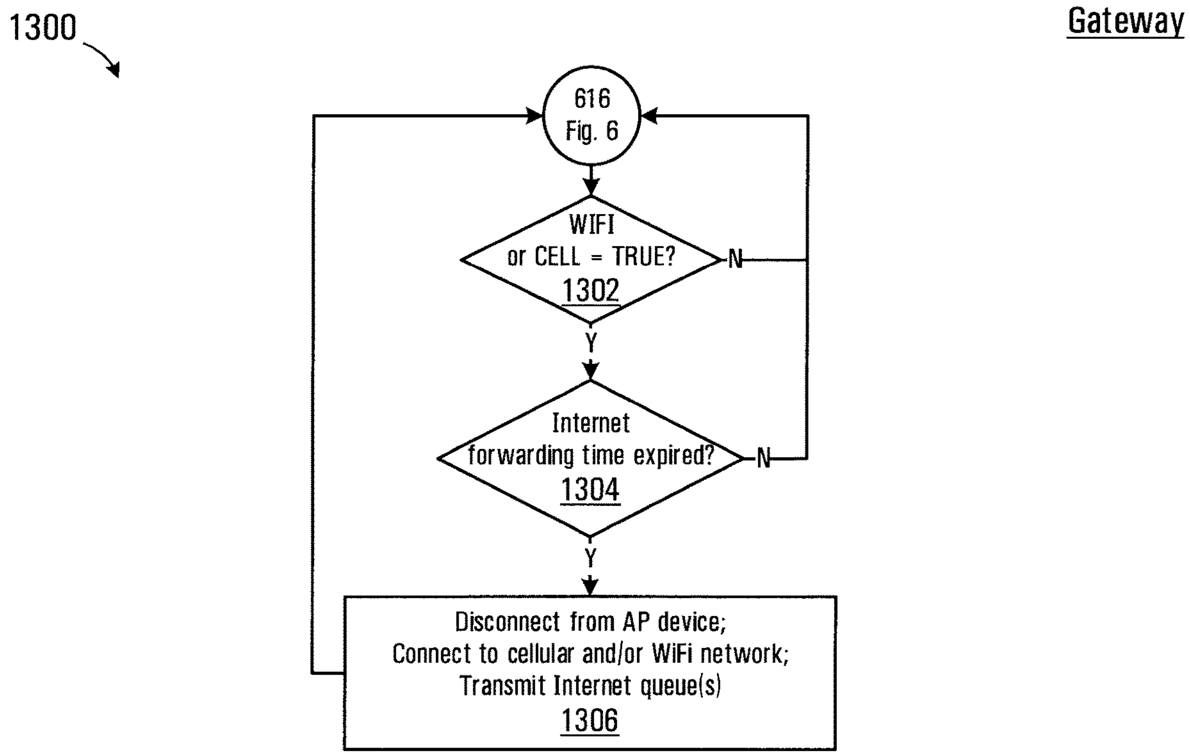
FIG. 13 is a process flowchart depicting blocks of code for directing the processor circuit of FIG. 2 to perform a second portion of a gateway process.

Referring back to FIG. 6, following block 616, the microprocessor 202 is optionally directed to execute another portion of the gateway process, which is shown in FIG. 13 at 1300. Referring to FIG. 13, the gateway process 1300 begins at block 1302, which directs the microprocessor 202 to determine whether either the WIFI or CELL flag in the system configuration location 248 of the non-volatile flash memory 210 is set to TRUE. If either flag is TRUE, then block 1304 directs the microprocessor 202 to determine whether an Internet forwarding timer has expired. The Internet forwarding timer records a time since the last forwarding of data in the internet queues, and once the timer reaches a predetermined limit, block 1304 directs the microprocessor 202 to block 1306. Block 1306 directs the microprocessor 202 to disconnect from the currently connected access point device and connect to the applicable cellular or WiFi network having an Internet gateway. Block 1306 also directs the microprocessor 202 to transmit the data in the internet queue(s) over the applicable network. Block 1306 then directs the microprocessor 202 back to block 616 to resume network operations. If at block 1302 no WiFi or cellular internet connection is present or at block 1304 the forwarding time has not yet expired, the microprocessor 202 is directed back to block 616.

The gateway process permits devices that have an internet connection to reach devices that may not be connected to the merged network cluster 306.

Referring back to FIG. 7, the message protocol 700 also provides for a data message type including a type field 7 (DATA), the required uuid corresponding to the transmitting device user identifier and a repeated data field 718 having a type of "Data" defined at 728. In this embodiment the Data type includes several fields including required fields length for holding the length of the data contents being transmitted and content for holding a data byte payload, and a data type defining the data in terms of the DiscoverType enumeration 726 as text, image, video, audio, etc. In this embodiment the Data type also includes a seq_number field and an offset field for optionally transmitting a large data file by splitting the data into a series of messages. The seq_number identifies the order of the series of messages for reassembly of the data file at the receiving device. The offset field defines a byte location of the content payload within the message.

Data may thus be encapsulated within the data field 718 of a message in accordance with the message protocol 700 and transmitted from a transmitting device in the network cluster 100 to a receiving device identified by the uuid in the message. In other embodiments, the request/response message protocol 700 may be used for exchanging messages during establishment and maintenance of the connections between devices making up the network cluster 100, while actual data transmission may take place using another data protocol or protocols that form part of the Internet protocol suite (such as UDP, TCP, RTP etc).

In FIG. 3, the merged network cluster 306 was described as being established using WiFi (i.e. an IEEE 802.11 wireless network), although as noted above, the wireless network may be established using other wireless networking protocols such as Bluetooth and/or Wi-Fi Direct. The wireless radio of some devices may be limited by the manufacturer from simultaneously operating in client mode and hotspot mode. The IEEE 802.11 wireless networked devices such as shown in FIG. 2 at 200 are also generally limited from simultaneously connecting to two different devices configured in access point mode. In FIG. 3, for example, even if the first device 102 and the first neighboring device 300 were in communications range, they may not be able to establish a connection using an IEEE 802.11 networking protocol due being configured in access point mode. In the embodiment shown in FIG. 3, the first device 102 and first neighboring device 300 are connected via the second device 104, which executes the client router process 800 shown in FIG. 8 to switch between being connected to the first device 102 and the first neighboring device 300, which are both configured in access point mode.

Figure 14:
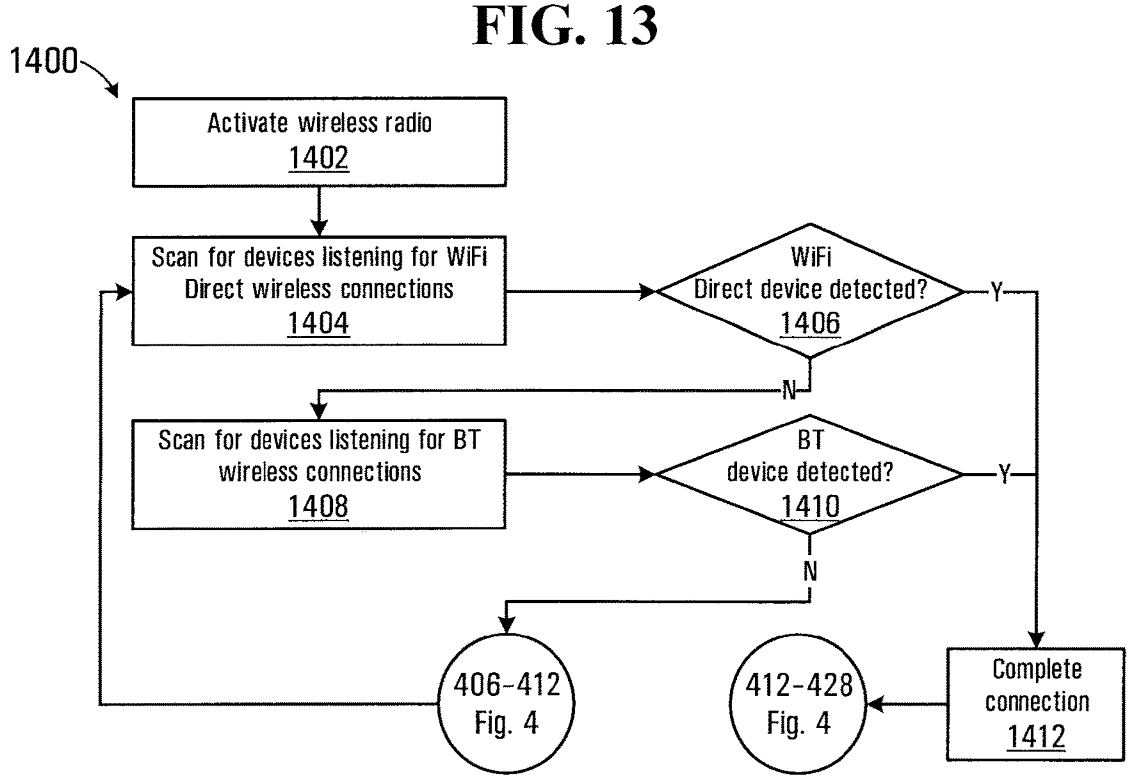
FIG. 14 is a process flowchart depicting blocks of code for directing the processor circuit of FIG. 2 to perform functions related to an alternative embodiment for establishing a cluster network.

Referring to FIG. 14, a process for establishment of the merged network cluster 306 in accordance with an alternative embodiment is shown at 1400. The process begins at block 1402, which directs the microprocessor 202 (FIG. 2) of the second device 104 to activate the wireless radio 216. Many devices have a wireless radio or wireless radios capable of Bluetooth, WiFi, and/or WiFi direct communications. Block 1404 then directs the microprocessor 202 to configure the wireless radio 216 to scan for other devices listening for WiFi Direct connections. The process 1400 then continues at Block 1406, which directs the microprocessor 202 to determine whether any devices listening for WiFi Direct connections have been detected. If a device listening for WiFi Direct connections is detected, block 1406 directs the microprocessor 202 to block 1412, which directs the microprocessor to complete the WiFi Direct connection with the other device.

Use of the Wi-Fi Direct protocol enables the device 104 to establish a Wi-Fi connection directly with another device (such as the devices 102 and 300) rather than through the wireless access points provided by these devices. As in the case of making the WiFi connections described above, the device performs an SSID broadcast (i.e. "Wave-*"). However in this case the SSID broadcast also includes passcode data. Conventional WiFi connections for establishing the merged network cluster 306 may be made on the basis of a single passcode that may be stored on each device in the application location 242 of non-volatile flash memory 210, for example. In the WiFi Direct connection embodiment the broadcast passcode may be generated to include a random number to differentiate from other WiFi and WiFi Direct connections between other devices that may also be in wireless range. The provision of the passcode in the SSID broadcast thus enables the WiFi Direct connection to proceed without prior knowledge of a passcode thus eliminating the need for user interaction in establishing the connection.

Following completion of the connection at block 1412, the microprocessor 202 is then directed back to the process 400 in FIG. 4 to execute blocks 412-428 as described above for joining the merged network cluster 306.

Figure 15:
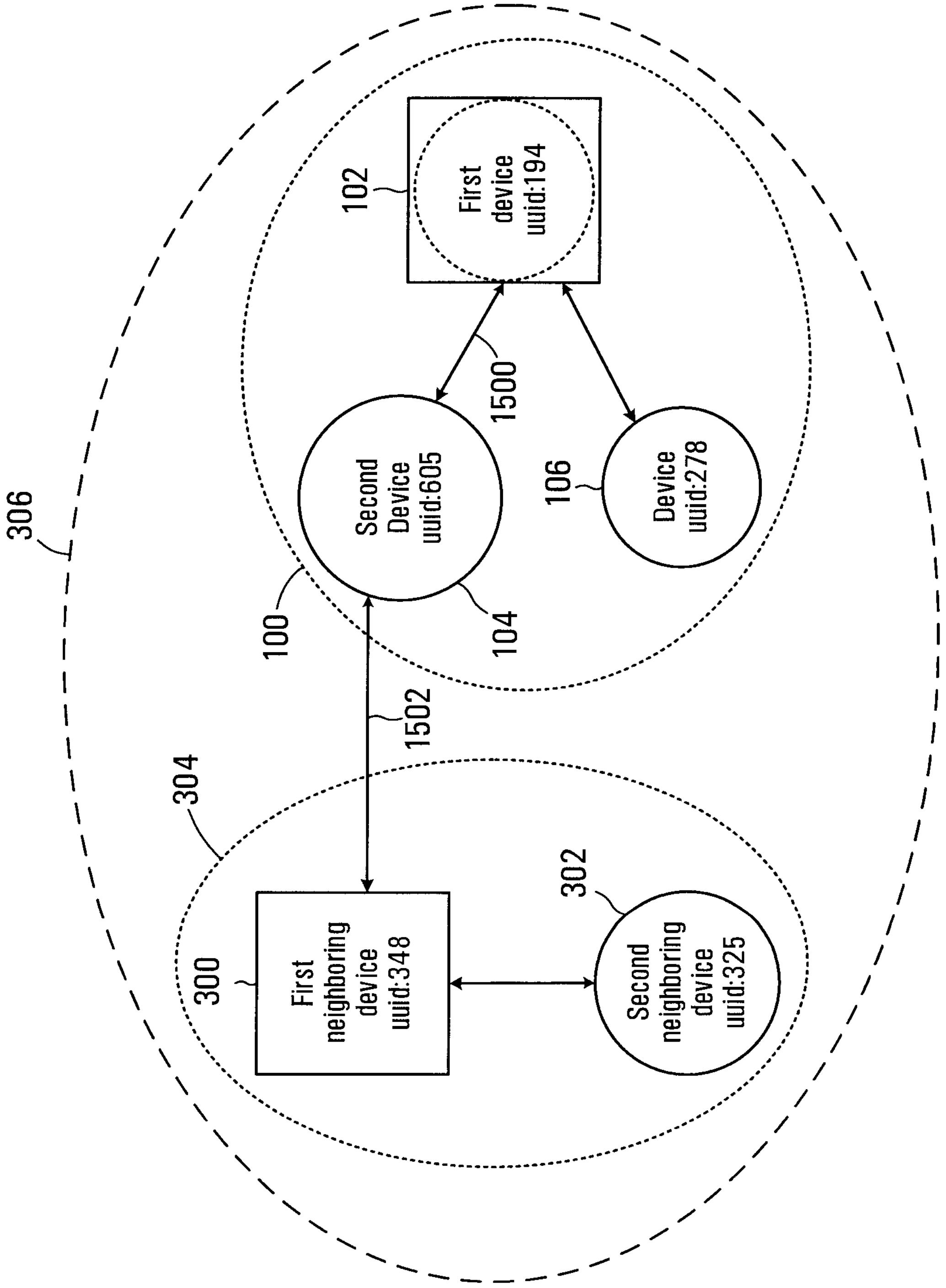
FIG. 15 is a schematic depiction of a network cluster established by the process shown in FIG. 14.

Referring to FIG. 15, in this embodiment establishment of the merged network cluster 306 may thus proceed by the second device 104 connecting via a WiFi Direct connection (shown as line 1500 in FIG. 15) to the first device 102. Blocks 1404, 1406, and 1412 may also be executed to cause the second device 104 to complete a Wi-Fi Direct connection with the first neighboring device 300. In this case, the second device 104 may provide a second link 1502 with the first neighboring device 300 thus providing a Wi-Fi Direct link between the network cluster 100 and the second neighboring network cluster 304. The device 104 will be configured in a Wi-Fi Direct master mode that permits connecting to multiple devices as clients (i.e. the devices 102 and 300). The devices 102 and 300 remain in the access point mode for providing connections to the device 106 and second neighboring device 302 respectively. When the devices 102 and 300 are configured in the access point mode, the operating system may limit the devices to being Wi-Fi Direct clients of the second device 104 in master mode. The wireless radio 216 of some devices may be implemented using a dual-mode WiFi module that can simultaneously be configured as an access point and still connect to another device as a Wi-Fi Direct client. This effectively eliminates the need under conventional WiFi connections for the second device 104 to perform the disconnection at block 808 of the client router process 800 shown in FIG. 8, which slows data throughput between the clusters 100 and 300.

Referring back to FIG. 14, if at block 1406, no device listening for WiFi Direct connections is detected, the microprocessor is directed to block 1408 where the wireless radio 216 is configured to scan for other devices listening for Bluetooth connections. Block 1410 then directs the microprocessor 202 to determine whether any devices listening for Bluetooth connections have been detected. If a device listening for Bluetooth connections is detected block 1410 directs the microprocessor 202 to block 1412 to complete the Bluetooth connection with the other device. The microprocessor 202 is then directed back to the process 400 in FIG. 4 to execute blocks 412-428 as described above.

If at block 1410, no device listening for Bluetooth connections is detected, the microprocessor is directed back to the process 400 in FIG. 4 to execute blocks 406-412 of the WiFi connection process as described above. Blocks 406 to 412 of the process 400 direct the microprocessor 202 to execute a portion of the cluster formation process 400 that cause the device to alternate between scanning for other devices configured in WiFi access point mode and configuring in access point mode as described above.

Referring again to FIG. 15, the establishment of the merged network cluster 306 may thus alternatively proceed by the second device 104 connecting via Bluetooth to both the first device 102 and the first neighboring device 300 (i.e. through a combination of the connections 1500 and 1502).

Figure 17:
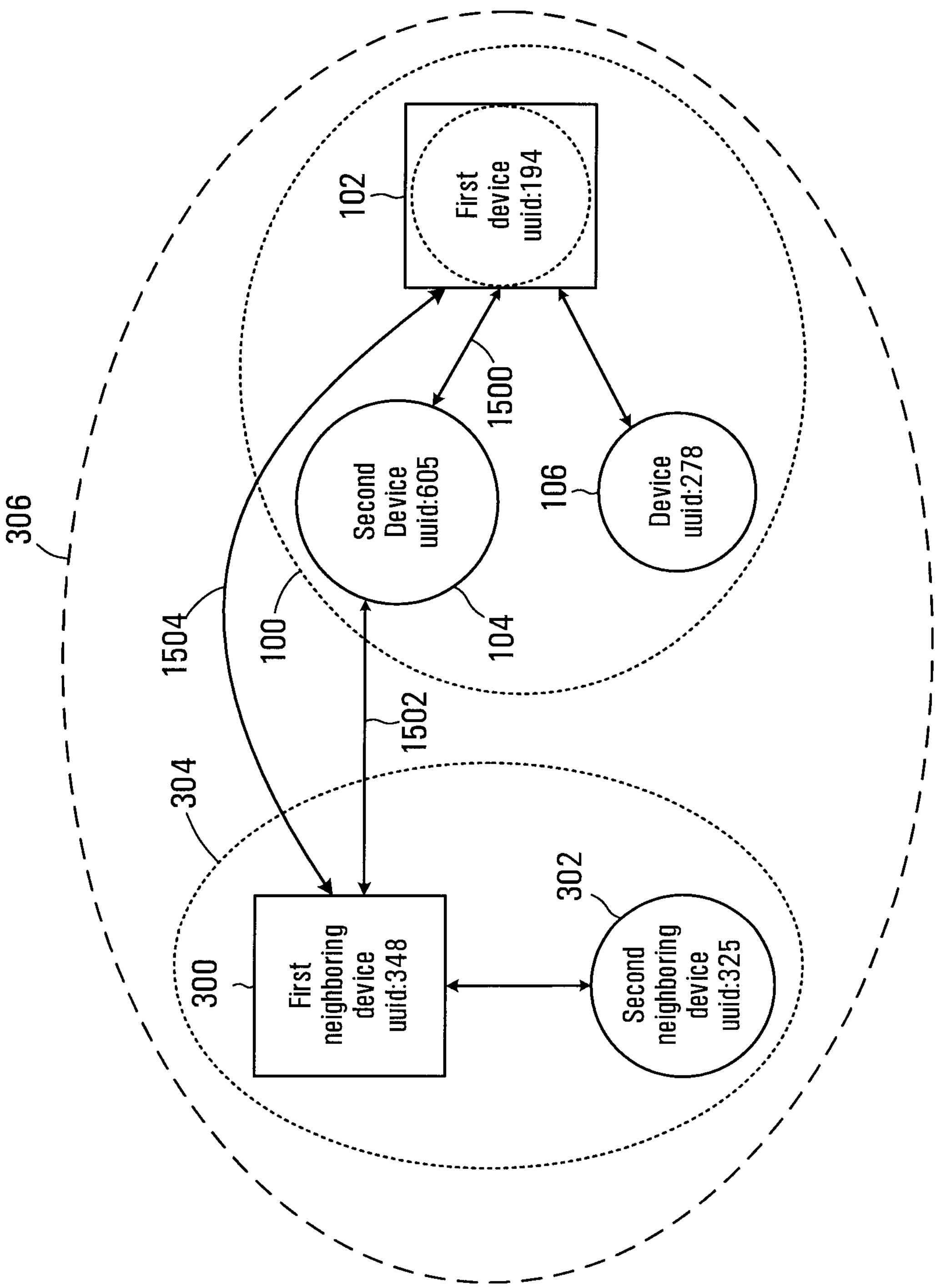
FIG. 17 is a schematic depiction of a network cluster established by the process shown in FIGS. 14 and 16.

Referring to FIG. 17, in another embodiment while the first device 102 and first neighboring device 300 may be prohibited via their respective operating systems from being configured as a Wi-Fi access points and simultaneously connecting with each other via Wi-Fi direct, these devices may still be able to simultaneously connect via Bluetooth by executing blocks 1408, 1410, and 1412 to establish a direct Bluetooth connection shown by the line 1504. The Bluetooth connection 1504 may be established simultaneously with the connections 1500 and 1502 established via the second device 104 (either through Wi-Fi Direct, Bluetooth, or through a switching Wi-Fi connection to the access points provided by the devices 102 and 300). The Bluetooth connection 1504 thus provides an additional simultaneous connection between the devices 102 and 300 that permits the devices to remain in access point mode for providing network services to the clients 106 and 302.

Figure 16:
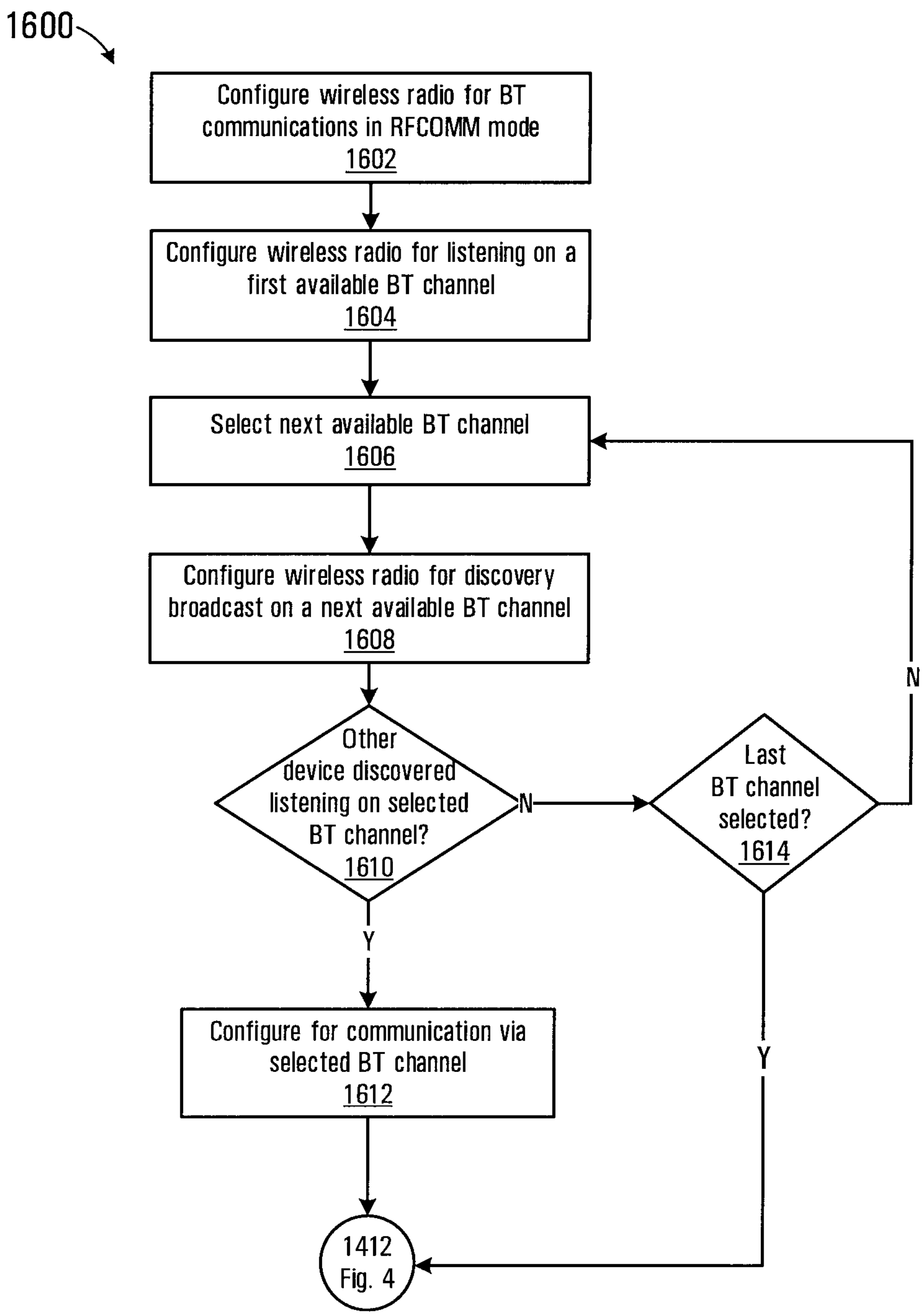
FIG. 16 is a process flowchart depicting blocks of code for directing the processor circuit of FIG. 2 to perform functions related to an establishing a cluster network using a Bluetooth communications protocol.

Referring to FIG. 16, a process flowchart depicting blocks of code for directing the first device 102 to implement the blocks 1408-1412 of the process 1400 in FIG. 14 for connecting via Bluetooth is shown in greater detail at 1600. The process begins at block 1602, which directs the microprocessor 202 to configure the wireless radio 216 of the first device 102 for Bluetooth communications using an RFCOMM protocol. Under the RFCOMM protocol no user interaction is required for pairing, which is an advantage for autonomously establishing connections to provide the merged network cluster 306. Other Bluetooth connection protocols may require user interaction such as a key pairing or similar operation. The RFCOMM protocol however does not provide for discovery by devices of which channels other devices are listening for connections. The RFCOMM protocol also does not allow for discovery of the uuid of other devices.

In the embodiment shown, block 1604 directs the microprocessor 202 to cause the wireless radio 216 of the first device 102 to configure the wireless radio to listen for BT broadcasts from other devices on a first available Bluetooth channel. The first device 102 is thus configured to listen for discovery broadcasts from other devices, should these be received. Devices may be able to communicate on a plurality of different channels (typically seven channels for an Android based operating system) to permit simultaneous Bluetooth connections to several other devices. For example, the device may be connected to a vehicle via Bluetooth and may be simultaneously connected to a Bluetooth earpiece or another device, thus using two or more of the available channels. In one embodiment, each channel is associated with a pre-determined pattern starting with a common string (for example "01010101-0101-0101-0101-01010101010") and each successive channel is incremented by 1. The first channel would thus be associated with a uuid "01010101-0101-0101-0101-010101010101", the second channel would be associated with a uuid "01010101-0101-0101-0101-010101010102", etc.

Block 1606 then directs the microprocessor the microprocessor 202 of the first device 102 to select a next available channel and block 1608 directs the microprocessor to configure the wireless radio 216 for a discovery broadcast on a next available Bluetooth channel (for example "01010101-0101-0101-0101-010101010102"). The process 1600 then continues at block 1610, which directs the microprocessor 202 to listen for a response on the selected channel. If at block 1610 the first neighboring device 300 is listening on the channel "01010101-0101-0101-0101-010101010102", a response would be received and block 1610 directs the microprocessor 202 to block 1612. Block 1612 directs the microprocessor 202 to configure for communications via the selected Bluetooth channel (i.e. channel "01010101-0101-0101-0101-010101010102"). At block 1612, if the connection is successfully completed, the Bluetooth connection is locked in between the devices 102 and 300 and allows for two-way data communication between the first device 102 and the first neighboring device 300. The first device 102 and the first neighboring device 300 may continue to be configured in access point mode and to provide services over the WiFi network to clients such as the client devices 106 and 302 respectively. The Bluetooth connection between the first device 102 and the first neighboring device 300 thus provides an alternative for merging the network cluster 100 and the second neighboring network cluster 304 to form the merged network cluster 306. In one embodiment the second device 104 is then able to connect to either the first device 102 or the first neighboring device 300, both of which were previously in range of the device. The first device 102 and first neighboring device 300 may thus continue to perform the functions generally as shown at blocks 412-428 in FIG. 4 by responding to requests and providing connection listings etc.

If at block 1610, the first neighboring device 300 is not listening on the channel "01010101-0101-0101-0101-010101010102", no response will be received and block 1610 directs the microprocessor 202 to block 1614. Block 1614 directs the microprocessor 202 to determine whether the last of the plurality of available Bluetooth channels have been selected. If there are remaining Bluetooth channels that have not yet been selected, block 1614 directs the microprocessor 202 back to block 1606 and the next available channel is selected and blocks 1608 and 1610 are repeated for the selected channel.

If at block 1614 there are no Bluetooth channels remaining to be selected, the microprocessor is directed to block 1412 of the process 1400 and the device will continue attempting to connect with other devices using WiFi and WiFi direct protocols before again attempting a Bluetooth connection as described above.

In another alternative embodiment if the first device 102 and the first neighboring device 300 are out of Bluetooth range the second device 104 may still act as a bridge for merging the network cluster 100 and second neighboring network cluster 304 by connecting via Bluetooth to both the first device 102 and the first neighboring device 300. The connection proceeds on an individual basis with each of the devices 102 and 300 generally in accordance with the process 1600. The second device 104 would thus need to have two Bluetooth channels available to permit merging of the network clusters 100 and 304.

The above embodiments provide a framework for connecting devices in a network wherein individual devices assume different modes of operation such access point mode, client mode, or client router mode. Devices in the network cluster 100 generally assume these modes of operation based on the availability or lack of availability of devices within the network cluster 100. Additionally, devices may change from one operating mode to another based on such availability. The disclosed embodiments thus provide an expandable network that is able to add devices or merge network clusters including multiple devices thus extending the reach of the merged network.

While specific embodiments have been described and illustrated, such embodiments should be considered illustrative of the invention only and not as limiting the invention as construed in accordance with the accompanying claims.

What is claimed is:

1. A method for establishing a network cluster between a plurality of devices, each device having a wireless radio configurable in at least an access point mode and a client mode, the network cluster having an associated network name, the method comprising:

causing a first device of the plurality of devices to be configured in the client mode;

in response to a determination by the first device that networking services associated with the network name are not currently being offered by another of the plurality of devices:

causing the first device to be configured in the access point mode;

offering networking services for the network name associated with the network cluster;

in response to receiving a connection request at the first device from a second device configured in the client mode, accepting the connection, determining a user identifier associated with the second device, and adding an entry for the second device to a connection listing saved in memory on the first device;

if no connection request is received at the first device while configured in the access point mode, causing the first device to alternate between being in the client mode for a first period of time and being in the access point mode for a second period of time until one of:

a connection request is received while the first device is in the access point mode; or another device offering networking services associated with the network name is discovered while in the client mode;

wherein at least one of the first and second periods of time includes a random time component; and in response to receiving one or more data packets at the first device having a destination corresponding to the user identifier of the second device, transmitting the one or more data packets to the second device.

2. The method of claim 1 further comprising:

in response to receiving connection requests at the first device from at least one additional device configured in the client mode, determining a user identifier associated with the additional device and adding the user identifier to the connection listing on the first device.

3. The method of claim 2 further comprising:

receiving a find request at the first device from an originating device configured in the client mode and connected to the first device, the find request including a user identifier associated with an intended recipient device;

causing the first device to determine whether the connection listing on the first device includes the user identifier associated with the recipient device, the connection listing including entries for devices that have previously been encountered by the first device on the network cluster; and causing the first device to transmit a find request response to the originating device if the connection listing includes the user identifier associated with the recipient device, the find request response including a network address of the first device as a nexthop address for transmission of data between the originating device and the recipient device.

4. The method of claim 3 wherein the connection listing on the first device includes at least one entry identifying a first neighboring device being connected to the first device via one or more devices configured in the client mode and in connection range of both the first device and the first neighboring device, and further comprising:

if the connection listing does not include the user identifier associated with the recipient device, causing the first device to transmit a discover request to the first neighboring device, the discover request including the user identifier of the recipient device and being operable to cause the first neighboring device to determine whether the recipient device is connected to a second neighboring device configured in the access point mode and connected to the first neighboring device via one or more devices configured in the client mode and in connection range of both the first and second neighboring devices;

in response to receiving a discover request response from the first neighboring device at the first device:

updating the connection listing on the first device to include an entry for the recipient device; and causing the first device to transmit a find request response to the originating device, the find request response including the network address of the first device as the nexthop address for transmission of data between the originating device and the recipient device via the first neighboring device and the second neighboring device.

5. The method of claim 4 wherein the discover request includes a time-to-live (TTL) data field defining a time period for which the discover request will be in effect to facilitate discarding of the discover request when the TTL expires.

6. The method of claim 4 wherein the discover request response includes a timestamp added to the discover request response by each neighboring device through which the request response traverses, the timestamp being operable to prevent repetition of the discover request within a predetermined timeframe.

7. The method of claim 4 wherein causing the first neighboring device to determine whether the recipient device is connected to the second neighboring device comprises forwarding the discover request to the second neighboring device, the discover request being operable to cause the second neighboring device to determine whether a connection listing on the second neighboring device includes the user identifier associated with the recipient device, and if the connection listing includes the user identifier associated with the recipient device, transmitting a discovery request response including a network address of the second neighboring device as a nexthop address back to the first device via the first neighboring device.

8. The method of claim 7 further comprising, in response to receiving the discovery request response at the first neighboring device, updating the connecting listing on the first neighboring device to include an entry for the recipient device including the network address of the second neighboring device as a nexthop address for transmission back to the second device and adding the network address of the first neighboring device to the discovery request response as a nexthop address for transmission back to the first device.

9. The method of claim 1 further comprising:

causing the second device to periodically determine whether any neighboring devices are configured in the access point mode and offering networking services for the network name associated with the network cluster;

in response to the second device detecting a first neighboring device offering networking services for the network name associated with the network cluster, causing the second device to link the first neighboring device to the network cluster to form a merged network cluster by:

requesting an updated connection listing from the first device;

disconnecting from the first device and connecting to the first neighboring device;

requesting a connection listing from the first neighboring device, the connection listing stored in memory on the first neighboring device and including user identifiers of devices that are connected to the first neighboring device;

providing the connection listing for the first device to the first neighboring device to facilitate updating of the connection listing on the first neighboring device;

reconnecting to the first device and providing the connection listing for the first neighboring device to the first device to facilitate updating of the connection listing on the first device; and wherein causing the first device to transmit received data packets, comprises:

in response to a determination by the first device that the received data packet has a destination corresponding to a device identifier associated with a client device in the connection listing on the first device that is connected to the first neighboring device, causing the data packet to be routed via the second device to the first neighboring device.

10. The method of claim 9 wherein causing the second device to periodically determine whether other devices are offering networking services for the network name associated with the network cluster comprises:

determining a basic service set identification (BSSID) associated with the first device;

causing the second device to perform a scan of available networks; and for each detected device offering networking services associated with the network name, determining a BSSID associated with the detected device, wherein the BSSID of the detected device differing from the BSSID of the first device is indicative that the detected device is configured in the access point mode and offering networking services for the network name.

11. The method of claim 9 wherein causing the data packet to be routed via the second device to the first neighboring device comprises:

in response to a determination by the first device that the second device is not currently connected to the first device, writing the data packet to a queue of data packets to be transmitted to the second device when connected to the first device.

12. The method of claim 9 wherein the second device includes a connected access point listing stored in memory on the second device, the connected access point listing including at least one entry identifying the first device as a connected access point and in response to the second device detecting the first neighboring device:

causing the second device to add the first neighboring device to the connected access point listing; and causing the second device to periodically connect to each access point in the connected access point listing to route data packets between the access points and destination clients in the merged network cluster.

13. The method of claim 9 wherein routing data packets comprises:

maintaining a queue in memory on the second device for storing data packets received from a currently connected one of the first device and the first neighboring device and destined for the other of the first device and the first neighboring device;

periodically disconnecting from the currently connected one of first device and the first neighboring device and connecting to the other first device and the first neighboring device; and transmitting the data in the queue to the other of the first device and the first neighboring device when connected.

14. The method of claim 1 wherein the entry for the second device stored in the connection listing on the first device includes at least a user identifier and one or more of:

a network address of the second device within the cluster network; and a hardware identifier associated with the second device.

15. A method for merging a first network cluster and a second network cluster each including a plurality of devices, each device having a wireless radio configurable in at least an access point mode and a client mode, the first network cluster including a first device and the second network cluster including a first neighboring device, the first device and first neighboring device being configured in the access point mode and offering networking services associated with a common network name, the method comprising:

causing a second device configured in the client mode and in connection range of both the first device and the first neighboring device to periodically determine whether any neighboring devices are configured in the access point mode and offering networking services for the network name associated with the network cluster;

in response to the second device detecting that the first neighboring device is offering networking services for the network name associated with the network cluster, causing the second device to link the first neighboring device to the network cluster to form a merged network cluster by:

requesting an updated connection listing from the first device;

disconnecting from the first device and connecting to the first neighboring device;

requesting a connection listing from the first neighboring device, the connection listing stored in memory on the first neighboring device and including user identifiers of devices that are connected to the first neighboring device;

providing the connection listing for the first device to the first neighboring device to facilitate updating of the connection listing on the first neighboring device; and reconnecting to the first device and providing the connection listing for the first neighboring device to the first device to facilitate updating of the connection listing on the first device.

16. The method of claim 15 wherein the second device includes a connected access point listing stored in memory on the second device, the connected access point listing including at least one entry identifying the first device as a connected access point and in response to the second device detecting the first neighboring device:

causing the second device to add the first neighboring device to the connected access point listing; and causing the second device to periodically connect to each access point in the connected access point listing to route data packets between the access points and destination clients in the merged network cluster.

17. The method of claim 1 wherein the network name includes a common identifier portion that identifies a network type and a random number identifying the specific instance of the network.

18. The method of claim 1 wherein in response to a determination by the first device that networking services associated with the network name are not currently being offered by another of the plurality of devices, further comprising causing the first device to be configured for one of Bluetooth and WiFi Direct communications and offering networking services for the network name associated with the network cluster.

* * * * *